(12) United States Patent
Honda et al.

(10) Patent No.: US 9,133,536 B2
(45) Date of Patent: Sep. 15, 2015

(54) GALVANNEALED STEEL SHEET AND PRODUCING METHOD THEREOF

(75) Inventors: Kazuhiko Honda, Tokyo (JP); Noriyuki Suzuki, Tokyo (JP); Yoichi Ikematsu, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 506 days.

(21) Appl. No.: 13/503,087

(22) PCT Filed: Jul. 12, 2010

(86) PCT No.: PCT/JP2010/061797
§ 371 (c)(1),
(2), (4) Date: Apr. 20, 2012

(87) PCT Pub. No.: WO2011/052269
PCT Pub. Date: May 5, 2011

(65) Prior Publication Data
US 2012/0211123 A1    Aug. 23, 2012

(30) Foreign Application Priority Data
Oct. 26, 2009    (JP) .................... 2009-245871

(51) Int. Cl.
*C22C 18/00*        (2006.01)
*B32B 15/01*        (2006.01)
(Continued)

(52) U.S. Cl.
CPC .............. *C22C 18/00* (2013.01); *B32B 15/013* (2013.01); *C22C 38/001* (2013.01); *C22C 38/02* (2013.01);
(Continued)

(58) Field of Classification Search
CPC .... B32B 15/013; C22C 18/00; C22C 38/001; C22C 38/02; C22C 38/04; C22C 38/06; C22C 38/14; C23C 28/345; C23C 2/06; C23C 2/28; C23C 2/40; C23C 28/321
See application file for complete search history.

(56) References Cited

U.S. PATENT DOCUMENTS 5,525,431 A * 6/1996 Kanamaru et al. ............ 428/623
2005/0139291 A1* 6/2005 Taira et al. .................... 148/277

FOREIGN PATENT DOCUMENTS

CN    1692175 A    11/2005
JP    59-074231 A    4/1984
(Continued)

OTHER PUBLICATIONS

Chinese Office Action dated Jun. 20, 2013 for Chinese Application No. 201080048050.7 with English translation.
(Continued)

*Primary Examiner* — Lois Zheng
(74) *Attorney, Agent, or Firm* — Birch, Stewart, Kolasch & Birch, LLP

(57) ABSTRACT

A galvannealed steel sheet includes: a steel sheet; a galvannealed layer which is formed on at least one surface of the steel sheet and includes Al, Fe, and the balance composed of Zn and inevitable impurities; and a composite oxide layer of Mn, Zn, and P which is formed on the surface of the galvannealed layer, includes Mn, P, and Zn, and has the P/Mn ratio of equal to or higher than 0.3 and equal to or lower than 50. The galvannealed layer includes a flat portion having an area ratio of equal to or higher than 10% and equal to or lower than 70% and a rough portion which is at a position closer to the steel sheet than the flat portion at the interface of the galvannealed layer and the composite oxide layer 5. The composite oxide layer of Mn, Zn, and P contains an amorphous compound.

14 Claims, 2 Drawing Sheets

(51) Int. Cl.
    *C22C 38/00*    (2006.01)
    *C22C 38/02*    (2006.01)
    *C22C 38/04*    (2006.01)
    *C22C 38/06*    (2006.01)
    *C22C 38/14*    (2006.01)
    *C23C 2/06*     (2006.01)
    *C23C 2/28*     (2006.01)
    *C23C 2/40*     (2006.01)
    *C23C 22/18*    (2006.01)
    *C23C 28/00*    (2006.01)

(52) U.S. Cl.
    CPC ............... *C22C 38/04* (2013.01); *C22C 38/06* (2013.01); *C22C 38/14* (2013.01); *C23C 2/06* (2013.01); *C23C 2/28* (2013.01); *C23C 2/40* (2013.01); *C23C 22/182* (2013.01); *C23C 28/321* (2013.01); *C23C 28/345* (2013.01)

(56) References Cited

FOREIGN PATENT DOCUMENTS

| | | |
|---|---|---|
| JP | 59-190332 A | 10/1984 |
| JP | 1-184227 A | 7/1989 |
| JP | 3-274251 A | 12/1991 |
| JP | 4-013816 A | 1/1992 |
| JP | 8-296065 A | 11/1996 |
| JP | 10-510322 A | 10/1998 |
| JP | 2002-105657 A | 4/2002 |
| JP | 2002-226976 A | 8/2002 |
| JP | 2003-293168 A | 10/2003 |
| JP | 2007-297705 A | 11/2007 |
| JP | 2009-079277 * 4/2009 ................ C23C 2/06 |

OTHER PUBLICATIONS

International Search Report for PCT/JP2010/061797 dated Aug. 10, 2010.

* cited by examiner

GALVANNEALED STEEL SHEET AND PRODUCING METHOD THEREOF

FIELD OF THE INVENTION

The present invention relates to a galvannealed steel sheet having excellent formability and a producing method thereof. Particularly, the present invention relates to a galvannealed steel sheet having significantly excellent deep drawability and a producing method thereof.

Priority is claimed on Japanese Patent Application No. 2009-245871, filed Oct. 26, 2009, the content of which is incorporated herein by reference.

DESCRIPTION OF RELATED ART

A galvannealed steel sheet is excellent in characteristics such as coating adhesion, corrosion resistance after coating, weldability, and the like. Therefore, galvannealed steel sheets are widely used for automobiles, home electrical appliances, building materials, and the like. The galvannealed steel sheet is produced by performing hot dip galvanization of a steel sheet on the surface and immediately thereafter heating and maintaining the steel sheet at a temperature equal to or greater than the melting point of zinc. As described above, as the galvanized steel sheet is heated and maintained, Fe in the steel sheet is diffused into the galvanized layer thereby forming a Zn—Fe alloy. However, since the alloying rate varies significantly depending on the composition and structure of the steel sheet, in order to control the formation of the Zn—Fe alloy, highly advanced techniques are required. In addition, a steel sheet for an automobile which is pressed into a complex shape requires very high formability. Particularly, in recent years, as the demand for corrosion resistance in automobiles has increased, cases where galvannealing is applied to steel sheets in automobiles has increased.

As the shapes of automobile bodies have become more complex, the demand on the formability of steel sheets has become stricter. Accordingly, galvannealed steel sheets having better formability, such as deep drawability, than existing steel sheets are required. It is known that in order to improve formability, particularly deep drawability, increasing the r-value (Lankford value r) of a steel sheet is effective.

In order to increase the r-value of the galvannealed steel sheet, a Ti-added ultra low carbon IF steel produced by adding Ti after reducing the content of C to an extremely low level, or a Ti—Nb-added ultra low carbon IF steel formed by compositely adding Ti and Nb, is generally used as a base material. For example, in Patent Citation 1 and Patent Citation 2, a producing method of a galvanized steel sheet, of producing a steel sheet having high ductility and a high r-value by defining composition of the steel sheet, the hot rolling condition, and the annealing conditions and performing hot dip galvanization on the surface of the steel sheet is disclosed.

However, such steel sheets have reduced content of solute C and solute N to improve formability, so that the alloying rate during alloying of the galvanizing layer is very fast. Therefore, there is a problem in that the alloying of the galvanizing layer proceeds too far and the Γ phase grows thick, so that the powdering resistance of the galvannealed steel sheet is degraded.

In the field of automobiles, in order to achieve both the function of protecting occupants during collision and a reduction in weight for enhancing fuel economy, a galvannealed steel sheet with high strength is needed. In order to increase the strength of the steel sheet, increasing the amount of C added is effective. However, the high-strength steel sheet containing C added cannot have an increased r-value unlike a mild steel sheet.

PATENT CITATION

[Patent Citation 1] Japanese Unexamined Patent Application, First Publication No. S59-74231

[Patent Citation 2] Japanese Unexamined Patent Application, First Publication No. S59-190332

SUMMARY OF THE INVENTION

Problems to be Solved by the Invention

Existing press-forming is focused on a reduction in the friction coefficient of the galvannealed steel sheet during the forming. However, in order to enhance the press-forming performance of a more complex shape, formability under high surface pressure needs to be considered.

Here, in order to solve the above problems, the present invention proposes a galvannealed steel sheet having excellent formability and a producing method thereof.

Methods for Solving the Problem

The inventors examined various methods for enhancing formability without degrading the productivity and plating adhesion of a galvanized steel sheet. As a result, the inventors found that the formability of the galvannealed steel sheet can be significantly enhanced by optimizing the area ratio of a flat portion on the surface of the galvannealed layer and forming a composite oxide layer of Mn, Zn, and P on the flat portion and thus have made the present invention.

The features of the present invention are as follows:

(1) According to an aspect of the present invention, a galvannealed steel sheet includes: a steel sheet; a galvannealed layer which is formed on at least one surface of the steel sheet and includes an amount equal to or more than 0.05 mass % and equal to or less than 0.5 mass % of Al, an amount equal to or more than 6 mass % and equal to or less than 12 mass % of Fe, an amount equal to or less than 2 mass % of at least one of Pb, Sb, Si, Sn, Mg, Mn, Ni, Cr, Co, Ca, Cu, Li, Ti, Be, Bi, and rare earth elements as needed, and the balance composed of Zn and inevitable impurities; and a composite oxide layer of Mn, Zn, and P which is formed on the surface of the galvannealed layer, includes an amount equal to or more than 0.1 mg/m$^2$ and equal to or less than 100 mg/m$^2$ of Mn, an amount equal to or more than 1 mg/m$^2$ and equal to or less than 100 mg/m$^2$ of P, and Zn, and has the P/Mn ratio of equal to or higher than 0.3 and equal to or lower than 50, wherein the galvannealed layer includes a flat portion having an area ratio of equal to or higher than 10% and equal to or lower than 70% and a rough portion which is at a position closer to the steel sheet than the flat portion at the interface of the galvannealed layer and the composite oxide layer 5, and the composite oxide layer of Mn, Zn, and P contains an amorphous compound.

(2) In the galvannealed steel sheet according to (1), the thickness of the composite oxide layer of Mn, Zn, and P may be equal to or higher than 0.1 nm and lower than 100 nm.

(3) In the galvannealed steel sheet according to (1), the thickness of the composite oxide layer of Mn, Zn, and P may be equal to or higher than 0.1 nm and lower than 10 nm.

(4) In the galvannealed steel sheet according to (1) or (2), the composite oxide layer of Mn, Zn, and P may include at least one of a phosphoric acid group, phosphorous acid group, and hypophosphorous acid group.

(5) In the galvannealed steel sheet according to (1) or (2), the surface roughness Ra of the rough portion may be equal to or higher than 0.5 μm and equal to or lower than 10 μm, and the surface roughness Ra of the flat portion may be equal to or higher than 0.01 μm and lower than 0.5 μm.

(6) In the galvannealed steel sheet according to (1) or (2), the ratio Iη/ISi of the X-ray diffraction intensity Iη of an interplanar spacing d of the galvannealed layer of 1.237 Å to the X-ray diffraction intensity ISi of an interplanar spacing d of an Si powder standard of 3.13 Å may be equal to or lower than 0.0006, the ratio Iζ/ISi of the X-ray diffraction intensity Iζ of an interplanar spacing d of the galvannealed layer of 1.26 Å to the X-ray diffraction intensity ISi of the interplanar spacing d of the Si powder standard of 3.13 Å may be equal to or higher than 0.0005, and the ratio IΓ/ISi of the X-ray diffraction intensity IΓ of an interplanar spacing d of the galvannealed layer of 1.222 Å to the X-ray diffraction intensity ISi of the interplanar spacing d of the Si powder standard of 3.13Å may be equal to or lower than 0.004.

(7) In the galvannealed steel sheet according to (1) or (2), the steel sheet may include by mass an amount equal to or more than 0.0001% and equal to or less than 0.004% of C, an amount equal to or more than 0.001% and equal to or less than 0.15% of Si, an amount equal to or more than 0.01% and equal to or less than 1.0% of Mn, an amount equal to or more than 0.001% and equal to or less than 0.1% of P, an amount equal to or less than 0.015% of S, an amount equal to or more than 0.001% and an amount equal to or less than 0.1% of Al, an amount equal to or more than 0.002% and equal to or less than 0.10% of Ti, an amount equal to or more than 0.0005% and equal to or less than 0.0045% of N, and the balance composed of Fe and inevitable impurities.

(8) In the galvannealed steel sheet according to (7), the steel sheet may further include by mass an amount equal to or more than 0.002% and equal to or less than 0.10% of Nb.

(9) In the galvannealed steel sheet according to (7), the steel sheet may further include by mass an amount equal to or more than 0.0001% and equal to or less than 0.003% of B.

(10) In the galvannealed steel sheet according to (7), the r-value of the steel sheet may be equal to or higher than 1.6 and equal to or lower than 2.2.

(11) In the galvannealed steel sheet according to (1) or (2), the steel sheet may include by mass an amount more than 0.004% and equal to or less than 0.3% of C, an amount equal to or more than 0.001% and equal to or less than 2% of Si, an amount equal to or more than 0.01% and equal to or less than 4.0% of Mn, an amount equal to or more than 0.001% and equal to or less than 0.15% of P, an amount equal to or less than 0.015% of S, an amount equal to or less than 2% of Al, an amount equal to or more than 0.0005% and equal to or less than 0.004% of N, and the balance composed of Fe and inevitable impurities.

(12) In the galvannealed steel sheet according to (1) or (2), the composite oxide layer of Mn, Zn, and P may include an aqueous P compound.

(13) According to another aspect of the present invention, a producing method of a galvannealed steel sheet includes: performing hot dip galvanization of a steel sheet; forming a galvannealed layer including an amount equal to or more than 0.05% and equal to or less than 0.5% of Al and an amount equal to or more than 6% and equal to or less than 12% of Fe by alloying; and after performing skin pass rolling, forming a composite oxide layer of Mn, Zn, and P on the surface of the galvannealed layer by controlling a treatment liquid so that an amount equal to or more than 0.1 mg/m² and equal to or less than 100 mg/m² of Mn and an amount equal to or more than 1 mg/m² and equal to or less than 100 mg/m² of P are included and the P/Mn ratio is 0.3 to 50.

(14) In the producing method of a galvannealed steel sheet according to (13), the skin pass rolling may be performed to achieve an elongation ratio of equal to or higher than 0.3% and equal to or lower than 2.0%.

(15) In the producing method of a galvannealed steel sheet according to (13) or (14), the treatment liquid may be applied to the surface of the galvannealed layer using a coating coater.

Effects of the Invention

The galvannealed steel sheet of the present invention has excellent deep drawability, and forming with a high deformation degree can be performed. Particularly, since the galvannealed steel sheet of the present invention has high formability under high surface pressure, it can be pressed into a complex shape. In addition, in the producing method of the galvannealed steel sheet of the present invention, the galvannealed steel sheet having excellent formability can be provided without degrading productivity and plating adhesion of the galvannealed steel sheet.

DETAILED DESCRIPTION OF THE INVENTION

Hereinafter, an embodiment of the present invention will be described in detail. In addition, in the present invention, % means mass % unless otherwise specified.

Figure 2A:
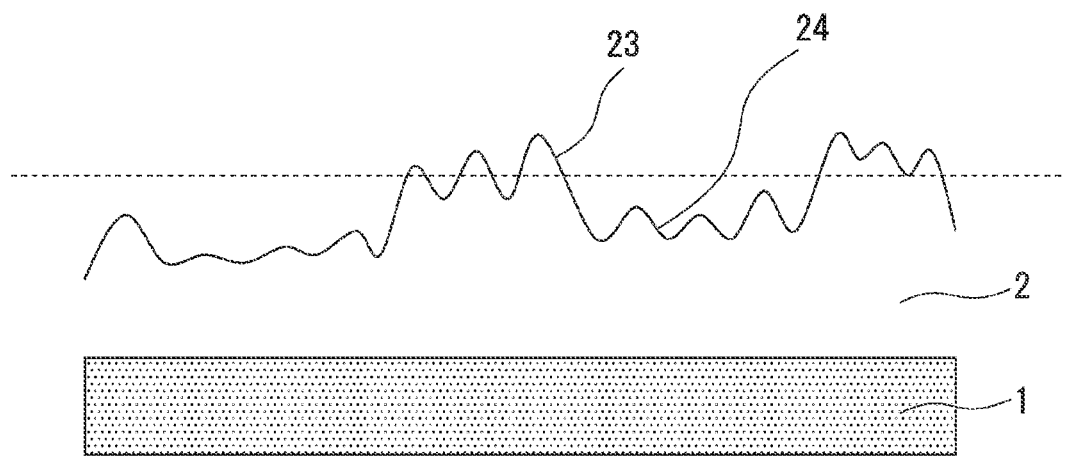
FIG. 2A is a schematic diagram showing an example of the galvannealed steel sheet before a flat portion is formed.
Figure 2B:
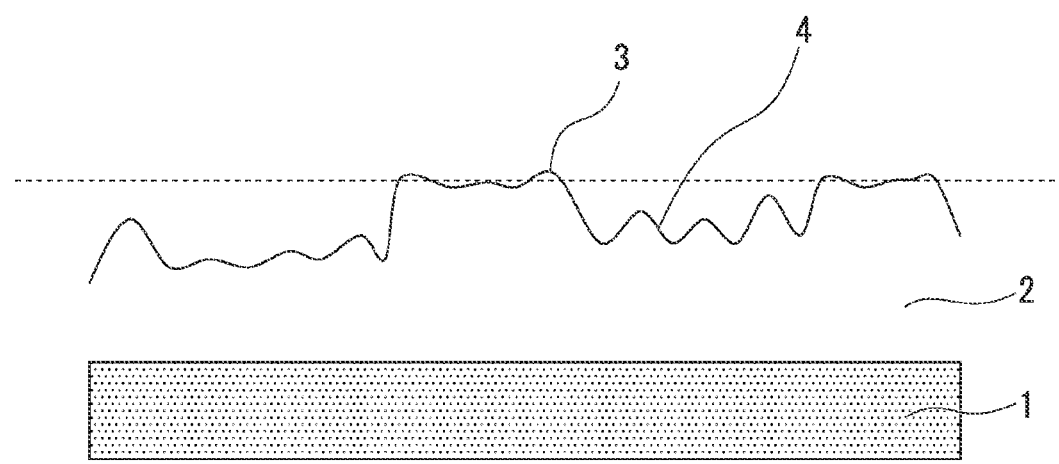
FIG. 2B is a schematic diagram showing an example of the galvannealed steel sheet after the flat portion is formed.
Figure 2C:
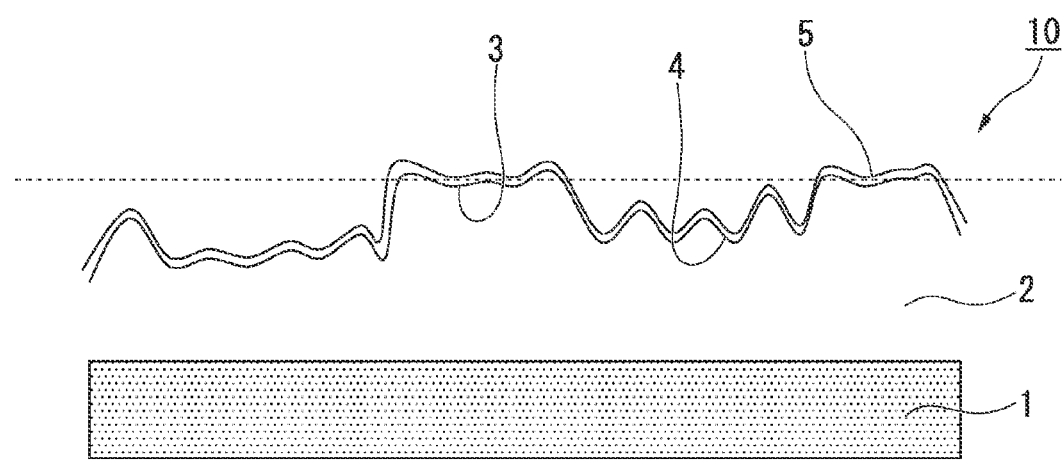
FIG. 2C is a schematic diagram showing the galvannealed steel sheet according to an embodiment of the present invention.

A galvannealed steel sheet according to an embodiment of the present invention includes, as illustrated in FIG. 2C, a steel sheet 1, a galvannealed layer 2 formed on at least one surface of the steel sheet 1, and a composite oxide layer 5 formed on the surface of the galvannealed layer 2. The galvannealed layer 2 contains an amount equal to or more than 0.05% and equal to or less than 0.5% of Al, an amount equal to or more than 6% and equal to or less than 12% of Fe, other necessary elements, and the balance composed of Zn and inevitable impurities. In addition, the composite oxide layer 5 contains an amount equal to or more than 0.1 mg/m² and equal to or less than 100 mg/m² of Mn, an amount equal to or more than 1 mg/m² and equal to or less than 100 mg/m² of P, and Zn. Moreover, the P/Mn ratio of the composite oxide layer 5 is equal to or higher than 0.3 and equal to or lower than 50 in terms of mass ratio. A flat portion 3 having an area ratio of equal to or more than 10% and equal to or less than 70% and a rough portion 4 that is at a position closer to the steel sheet 1 than the flat portion 3 are formed on the galvannealed layer 2 at the interface with the composite oxide layer 5. Moreover, the surface roughness Ra of the rough portion 4 is greater than the surface roughness Ra of the flat portion 3.

In this embodiment, the Al composition of the galvannealed layer 2 is limited to 0.05 to 0.5%. When the Al composition is less than 0.05%, during alloying, Zn—Fe alloying proceeds too far, and a brittle alloy layer is overdeveloped at the interface between the steel substrate (steel sheet 1) and the galvannealed layer (galvannealed layer 2). Accordingly, plating adhesion between the steel substrate and the galvannealed layer deteriorates. On the other hand, when the Al composition is higher than 0.5%, a very thick Fe—Al—Zn-based barrier layer is formed such that alloying does not proceed during alloying. Accordingly, the galvannealed layer cannot achieve the target content of iron. The Al composition is preferably 0.1 to 0.4% and more preferably 0.15 to 0.35%.

The Fe composition is limited to 6 to 12%. When the Fe composition is lower than 6%, Zn—Fe alloying does not sufficiently proceed on the galvannealed surface and press formability is significantly degraded. In addition, when the Fe composition is higher than 12%, a brittle alloy layer is overdeveloped at the interface between the galvannealed layer and the steel sheet 1 (steel substrate) and thus plating adhesion deteriorates. The Fe composition is preferably 8 to 12% and more preferably 9 to 11.5%.

In the embodiment, in the galvannealed layer 2, a plurality of alloy phases exists due to differences of Fe content during alloying. As the alloy phases, for example, there are η phase, ζ phase, $δ_1$ phase, Γ phase, and $Γ_1$ phase. Since the η phase is soft, the galvannealed layer adheres to a die and results in exfoliation, called flaking, in press-forming. Flaking is a phenomenon in which a soft phase having a high coefficient of friction, and thereby having a bad sliding property, adheres to a die and exfoliates. In addition, the Γ phase and $Γ_1$ phase are hard and brittle and thereby result in exfoliation, called powdering, during processing. Powdering is a phenomenon in which a hard and brittle phase becomes powder and exfoliates during processing. Therefore, in order to obtain a galvannealed layer 2 having excellent formability and adhesion performance, the η phase, Γ phase, and $Γ_1$ phase in the galvannealed layer are reduced as much as possible, and at least one kind of the ζ phase and $δ_1$ phase needs to be contained as a main alloy phase.

In the embodiment, the η phase is a hexagonal Zn phase having lattice constants of a=2.66 Å and c=4.94 Å. The ζ phase is a monoclinic intermetallic compound having lattice constants of a=13.4 Å, b=7.6 Å, c=5.06 Å, and β=127.3°. $FeZn_{13}$ is considered as the intermetallic compound of the ζ phase. The $δ_1$ phase is a hexagonal intermetallic compound having lattice constants of a=12.8 Å and c=57.4 Å. $FeZn_7$ is considered as the intermetallic compound of the $δ_1$ phase. The $Γ_1$ phase is a face-centered cubic intermetallic compound having a lattice constant of a=17.96 Å. $Fe_5Zn_{21}$ or $FeZn_4$ is considered as the intermetallic compound of the $Γ_1$ phase. The Γ phase is a body-centered cubic intermetallic compound having a lattice constant of a=8.97 Å. $Fe_3Zn_{10}$ is considered as the intermetallic compound of the Γ phase.

In the embodiment, hot dip galvanization is performed on the steel sheet 1 and then is heated and subjected to alloying to diffuse Fe into the galvanizing layer, thereby producing a galvannealed steel sheet 10. Due to the diffusion of Fe, a Fe—Zn intermetallic compound is generated and grown in the order of the ζ phase, $δ_1$ phase, $Γ_1$ phase, and Γ phase, and the η phase disappears. When alloying is continued after the η phase disappears, Fe is further diffused, the ζ phase disappears, and the $δ_1$ phase, the $Γ_1$ phase, and the Γ phase are grown.

Here, as the Γ phase is thickened, the exfoliation called powdering is more likely to occur during processing. Therefore, it is preferable that alloying be performed so that the η phase disappears and the Γ phase is not grown.

Specifically, as described below, it is preferable that the ratio (amount of each alloy phase) of the X-ray diffraction intensity of each alloy phase to the X-ray diffraction intensity of an interplanar spacing d of 3.13 Å in a Si powder standard be controlled. That is, the ratio Iη/ISi of the X-ray diffraction intensity Iη of an interplanar spacing d of 1.237 Å of the η phase to the X-ray diffraction intensity ISi of the Si powder standard is preferably equal to or lower than 0.0006 (including 0), and more preferably equal to or lower than 0.0004 (including 0). In addition, the ratio Iζ/ISi of the X-ray diffraction intensity Iζ of an interplanar spacing d of 1.26 Å of the ζ phase to the X-ray diffraction intensity ISi of the Si powder standard is preferably equal to or higher than 0.0005, and more preferably equal to or higher than 0.001. The upper limit of the ratio Iζ/ISi of the X-ray diffraction intensities may be 0.1. Moreover, the ratio IΓ/ISi of the X-ray diffraction intensity IΓ of an interplanar spacing d of 1.222 Å of the Γ phase to the X-ray diffraction intensity ISi of the Si powder standard is preferably equal to or lower than 0.004 (including 0) and more preferably equal to or lower than 0.002 (including 0). In addition, it is difficult to distinguish between the Γ phase and the $Γ_1$ phase in the X-ray diffractometry, and both the Γ phase and the $Γ_1$ phase are treated as the Γ phase.

When Iη/ISi is equal to or lower than 0.0006, an amount of η phase is infinitesimal, so that degradation of plating adhesion due to flaking is not observed. Accordingly, Iη/ISi is preferably equal to or lower than 0.0006 and more preferably equal to or lower than 0.0004 (including 0).

In addition, when IΓ/ISi is equal to or lower than 0.004, the Γ phase is thin enough, so that degradation of plating adhesion due to powdering is not observed. Accordingly, IΓ/ISi is preferably equal to or lower than 0.004 and more preferably equal to or lower than 0.002 (including 0).

Particularly, it is preferable that a steel sheet having a high alloying rate such as ultra low carbon IF steel be suitably subjected to alloying so that the η phase almost disappears and the ζ phase remains in order for IΓ/ISi to be equal to or lower than 0.004. In addition, when Iζ/ISi is equal to or higher than 0.0005, Γ phase is not grown so much during the progress of alloying, so that degradation of the plating adhesion due to powdering can be suppressed. Accordingly, Iζ/ISi is preferably equal to or higher than 0.0005 and more preferably equal to or higher than 0.001.

In the embodiment, the amount of the $δ_1$ phase is not particularly defined. However, since the $δ_1$ phase exhibits better performance than other alloy phases against flaking and powdering, a greater amount of the $δ_1$ phase is more preferable. Specifically, it is preferable that the ratio $Iδ_1$/ISi of the X-ray diffraction intensity $Iδ_1$ of an interplanar spacing d of 1.237 Å of the $δ_1$ phase to the X-ray diffraction intensity ISi of an interplanar spacing d of 3.13 Å of the Si powder standard be equal to or higher than 0.001. The upper limit of the ratio $Iδ_1$/ISi of the X-ray diffraction intensities may be 0.1.

In the embodiment, the effect of the present invention is not degraded even when an amount equal to or less than 2 mass % of at least one of Pb, Sb, Si, Sn, Mg, Mn, Ni, Cr, Co, Ca, Cu, Li, Ti, Be, Bi, and rare earth elements is contained or incorporated into the galvannealed layer. The elements may be helpful for the improvement of corrosion resistance or the like depending on the amount. The coated amount of the galvannealed layer is not particularly limited. Here, in view of corrosion resistance, the coated amount of the galvannealed layer is preferably equal to or higher than 20 g/m², and more preferably equal to or higher than 25 g/m². In addition, in view of economical reasons, the coated amount of the galvannealed layer is preferably equal to or lower than 150 g/m² and more preferably equal to or lower than 100 g/m².

Moreover, in the embodiment, in order to enhance formability of the galvannealed steel sheet 10, the composite oxide layer 5 (composite oxide film) is formed on the surface of the galvannealed layer 2. The composite oxide layer 5 contains 0.1 to 100 mg/m² of Mn, 1 to 100 mg/m² of P, and Z, and the P/Mn ratio in the composite oxide layer 5 is 0.3 to 50. The composite oxide layer 5, as described above, may be formed by controlling the layer composition to cause the galvannealed layer 2 having a low Fe content to directly react with Mn. Therefore, the composite oxide layer contains an amorphous compound, and adhesion of the galvannealed layer on the surface of the galvannealed steel sheet is suppressed by the amorphous compound, thereby enhancing lubricity and chemical conversion treatability. Moreover, unlike an oxide having a strong crystal structure (crystalline), the amorphous compound has flexibility and thus easily follows deformation. Accordingly, even in a thin composite oxide layer, a new surface is less likely to be formed during processing.

That is, when the Mn content is less than 0.1 mg/m², adhesion of the galvannealed layer to a die cannot be sufficiently suppressed, so that formability is degraded. When the Mn content is more than 100 mg/m², the effect of suppressing the adhesion of the galvannealed layer is saturated. Accordingly, the Mn content in the composite oxide layer 5 of the Mn, Zn, and P is limited to 0.1 to 100 mg/m². In addition, when the P content is less than 1 mg/m², a lubricating effect from the composite oxide layer 5 is not sufficient, so that formability is degraded. When the P content is more than 100 mg/m², the lubricating effect from the composite oxide layer 5 is saturated. Accordingly, the P content of the composite oxide layer 5 of Mn, Zn, and P is limited to 1 to 100 mg/m². When high formability is needed, it is preferable that the Mn content be 0.5 to 100 mg/m² and the P content be 2 to 100 mg/m², and it is more preferable that the Mn content be 2 to 70 mg/m² and the P content be 10 to 70 mg/m².

In addition, when the P/Mn ratio (mass ratio) is higher than 50, adhesion strength of the composite oxide layer 5 is degraded. When the P/Mn ratio is lower than 0.3, a desired composite oxide layer cannot be obtained. Accordingly, the P/Mn ratio is limited to 0.3 to 50. In order to form a reaction area in which the galvannealed layer 2 directly reacts with Mn on the surface of the composite oxide layer 5, the P/Mn ratio of the composite oxide layer 5 is preferably 0.3 to 30 and more preferably 0.5 to 20. The reaction area enhances adhesion between the galvannealed layer 2 and the composite oxide layer 5 and simultaneously enhances lubricity as it exists on the surface of the composite oxide layer 5.

The Zn content of the composite oxide layer 5 of Mn, Zn, and P does not have a significant effect on the formability of the galvannealed steel sheet 10 and thus is not particularly limited. In order to suppress the production costs of the galvannealed steel sheet 10, it is preferable that the Zn content is 0.1 to 300 mg/m² and the Zn/Mn ratio is equal to or lower than 20.

It is preferable that the thickness of the composite oxide layer 5 be equal to or greater than 0.1 nm and smaller than 100 nm. When the thickness of the composite oxide layer 5 is equal to or greater than 0.1 nm, a sufficient adhesion suppressing effect and lubricating effect can be obtained, thereby enhancing formability. On the other hand, when the thickness of the composite oxide layer 5 is smaller than 100 nm, the compound area (reaction area) in which the galvannealed layer 2 and Mn directly react with each other is caused to reliably remain on the surface of the composite oxide layer 5. Accordingly, without saturating the effect of enhancing formability, costs can be adequately reduced. When higher formability is needed, it is preferable that the thickness of the composite oxide layer 5 be equal to or greater than 1 nm. When cost savings are more important, it is more preferable that the thickness of the composite oxide layer 5 be equal to or smaller than 50 nm. As the thickness of the composite oxide layer 5 is increased, lubricity is enhanced, and thus the amount of the steel sheet deformed in press-forming is increased. However, a too great amount deformed results in wrinkles in press-forming. Therefore, in order to exhibit the maximum lubricating effect using a component that easily winkles, it is preferable that the thickness of the composite oxide be smaller than 10 nm. Moreover, the thickness needed for the composite oxide is influenced by the area ratio and the surface roughness of the flat portion 3 of the galvanized layer which will be described later. As the area ratio of the flat portion 3 is increased, the area in which the galvannealed layer and the die come in contact with each other is enlarged, thereby improving the lubricity enhancement effect of the composite oxide layer 5 . Therefore, even though the thickness of the composite oxide layer is equal to or greater than 0.1 nm and smaller than 10 nm, a sufficient lubricating effect can be obtained.

The composite oxide of Mn, Zn, and P in the composite oxide layer 5 is an amorphous compound generated by reacting Mn or ions of an oxide thereof, Zn or ions of an oxide thereof, and a compound including an oxide of P with each other. It is preferable that at least one of phosphoric acid group, phosphorous acid group, and hypophosphorous acid group be included in the amorphous compound (composite oxide layer 5 ). As at least one of phosphoric acid group, phosphorous acid group, and hypophosphorous acid group is included in the composite oxide, adhesion and film formability of a composite oxide film are enhanced, and high formability can be obtained by even a thin film of equal to or greater than 0.1 nm and smaller than 100 nm as described above. Here, when the outermost surface of the composite oxide layer 5 includes only the phosphoric acid group, phosphorous acid group, and hypophosphorous acid group, there may be the case where adhesion of the galvannealed layer to the die cannot be sufficiently suppressed. Therefore, in order to enhance formability of the galvannealed steel sheet 10, it is preferable that the outermost surface of the composite oxide layer 5 include a compound generated by reacting Mn with at least one of the phosphoric acid group, phosphorous acid group, and hypophosphorous acid group. When a film is formed on the galvannealed layer, Zn is also reacted with Mn and the at least one of the phosphoric acid group, phosphorous acid group, and hypophosphorous acid group, thereby reducing production costs. The compound generated by reacting Mn with P and Zn has very high lubricity, so that it is preferable that the compound be included in the surface of the composite oxide layer 5. In addition, as a mixed layer of the composite oxide of Mn, Zn, and P and an aqueous P compound is formed, inflow resistance of a portion applied with high surface pressure is reduced, so that formability at a high surface pressure is enhanced. Therefore, it is preferable that the aqueous P compound be included in the composite oxide layer 5.

In addition, ions and compounds such as oxides, hydroxides, phosphates, phosphites, hypophosphites, sulfates, and nitrates of one or more kinds of elements including Li, Be, C, F, Na, Mg, Si, Cl, K, Ca, Ni, Mo, V, W, Ti, Fe, Rb, Sr, Y, Al, Nb, Cs, Ba, and lanthanoids do not have an adverse effect on the properties of the composite oxide layer 5 such as lubricity, chemical conversion treatability, and adhesive compatibility (adhesion). Therefore, such ions and compounds may be incorporated into the composite oxide layer 5 at a certain degree (10% or less (including 0%) of the total amount of the film). Moreover, a small amount of (equal to or less than 10% (including 0%) of the total amount of the film) Cr, Cd, Pb, Sn, and As hardly has adverse effects such as degradation of chemical conversion treatability and contamination of a chemical conversion treatment liquid. Therefore, a small amount of the elements may be included in the composite oxide layer 5.

In the embodiment, the composite oxide layer 5 of Mn, Zn, and P suppresses adhesion of the galvannealed layer to the die and imparts lubricity thereby enhancing formability of the galvannealed steel sheet 10. Here, when the galvannealed layer is significantly deformed in press-forming to form a new surface and the new surface comes in contact with the die, the formability enhancement effect of the composite oxide layer 5 cannot be exhibited. As illustrated in FIG. 2A, since unevenness (rough surface) occurs in the galvannealed layer 2 during an alloying reaction, when the galvannealed layer 2 comes in contact with the die at high surface pressure, stress is concentrated on a protruded portion 23 in press-forming and the galvannealed layer is significantly deformed. Accordingly, it is difficult to sufficiently exhibit the formability enhancement effect of the composite oxide layer 5 in press-forming at high surface pressure. Therefore, according to the embodiment, as illustrated in FIG. 2B, the protruded portion is deformed to become the flat portion 3 in advance (for example, subjected to skin pass rolling corresponding to the dashed line in FIG. 2A) such that the composite oxide layer 5 of Mn, Zn, and P is formed on the deformed galvannealed layer 2.

Specifically, the surface of the galvannealed layer 2 has the flat portion 3 and the rough portion 4 (recessed portion) formed at a position (relatively low position) closer to the steel sheet 1 than the flat portion 3. The area ratio occupied by the flat portion 3 is 10 to 70%, and the composite oxide layer 5 of Mn, Zn, and P is formed on the flat portion 3. In press-forming, the flat portion 3 comes in contact with the die and is applied with surface pressure from the die. Accordingly, when the area ratio of the flat portion 3 is equal to or higher than 10%, the surface pressure from the die can be reduced, and simultaneously, the formability enhancement effect of the composite oxide can be sufficiently exhibited. When the area ratio of the flat portion 3 is lower than 10%, the surface pressure applied to the flat portion 3 from the die is too great, the galvannealed layer is deformed and thus formability is degraded. Therefore, the area ratio of the flat portion 3 of the galvannealed layer 2 is equal to or higher than 10%.

As the area of the flat portion 3 is increased, the formability enhancement effect of the galvannealed steel sheet 10 can be obtained at a higher surface pressure (stronger processing force). Accordingly, a higher area ratio of the flat portion 3 is more preferable. However, in order to obtain the flat portion 3 having an area ratio of higher than 70%, the galvannealed steel sheet has to be subjected to quite significant deformation, and at the same time the quality of the steel sheet itself is deteriorated. Therefore, in consideration of comprehensive performance of the galvannealed steel sheet 10, the area ratio of the flat portion is equal to or lower than 70%. Particularly, when press-forming is performed at a high deformation degree with the die having high surface pressure, in order to suppress the formation of a new surface, the area ratio of the flat portion 3 is preferably equal to or higher than 20% and more preferably equal to or higher than 30%. In addition, in order to reliably ensure properties of the base material (base steel sheet 1) of the galvannealed steel sheet 10, the area ratio of the flat portion 3 is preferably equal to or lower than 50% and more preferably equal to or lower than 40%.

In addition, in the embodiment, it is preferable that the surface roughness Ra of the flat portion 3 be lower than 0.5 µm. When the surface roughness is lower than 0.5 µm, the area in which the above-mentioned reaction area and the die are in contact with each other can be enlarged, thereby suppressing the deformation of the galvannealed layer of the flat portion 3 in press-forming. Accordingly, there is no problem with contact between the newly-formed surface and the die and thus a sufficient formability-enhancement effect of the composite oxide can be obtained. In addition, in order to further enlarge the contact area of the above-mentioned reaction area and the die, a lower surface roughness of the flat portion 3 is more preferable. Particularly, when press-forming is formed at a high deformation degree with the die having a high surface pressure, in order to further enlarge the contact area of the above-mentioned reaction area and the die, the surface roughness of the flat portion 3 is preferably lower than 0.35 µm, and more preferably lower than 0.15 µm. However, the surface roughness that can be easily controlled industrially is equal to or higher than 0.01 µm. Accordingly, the lower limit of the surface roughness is preferably 0.01 µm, and more preferably 0.05 µm. As the surface roughness of the flat portion 3 is reduced, most of the reaction area of the composite oxide directly comes in contact with the die. Therefore, as long as the surface roughness Ra of the flat portion 3 is controlled to be lower than 0.5 µm, a sufficient lubricating effect can be obtained from the composite oxide layer at even a small thickness.

In addition, in the embodiment, the rough portion 4 (recessed portion) which is formed at a relatively lower position than the flat portion 3 is a portion of the galvannealed layer having a relatively smaller thickness than the flat portion 3 as observed in the perpendicular direction of the thickness direction of the steel sheet. The surface roughness Ra of the rough portion 4 is preferably equal to or higher than 0.5 µm and equal to or lower than 10 µm, and more preferably, equal to or higher than 1 µm and equal to or lower than 5 µm. The surface roughness of the rough portion 4 is determined by the alloying condition of the galvanized layer. Under an alloying condition in which the surface roughness of the rough portion 4 is higher than 10 µm, a brittle alloy layer is developed on the interface between the galvanized layer and the steel sheet 1, so that plating adhesion is degraded. Accordingly, the surface roughness of the rough portion 4 is preferably equal to or lower than 10 µm, and more preferably, equal to or lower than 5 µm. In addition, under an alloying condition in which the surface roughness of the rough portion 4 is equal to or higher than 0.5 µm, Zn—Fe alloying is sufficiently performed on the surface of the galvanized layer and thus sufficient press formability can be ensured. Accordingly, the surface roughness of the rough portion 4 is preferably equal to or higher than 0.5 µm, and more preferably, equal to or higher than 1 µm. It is preferable that the difference between the surface roughness of the flat portion 3 and the surface roughness of the rough portion 4 be equal to or higher than 0.1 µm.

As the base steel sheet, any of a hot-rolled steel sheet and a cold-rolled steel sheet may be used. Regardless of the type of the base steel sheet, the flat portion 3 that ensures an area ratio of equal to or higher than 10% and equal to or lower than 70% is formed on the surface of the galvannealed layer, and the composite oxide layer 5 of Mn, Zn, and P is formed on the flat portion 3, so that it is possible to enhance formability. Specifically, the relationship between Lankford value r (r-value) of the steel sheet and limiting drawing ratio R obtained by a TZP test may satisfy Formula (1) as follows:

$$R \geq 0.3 \times r + 1.74 \qquad (1)$$

Figure 1:
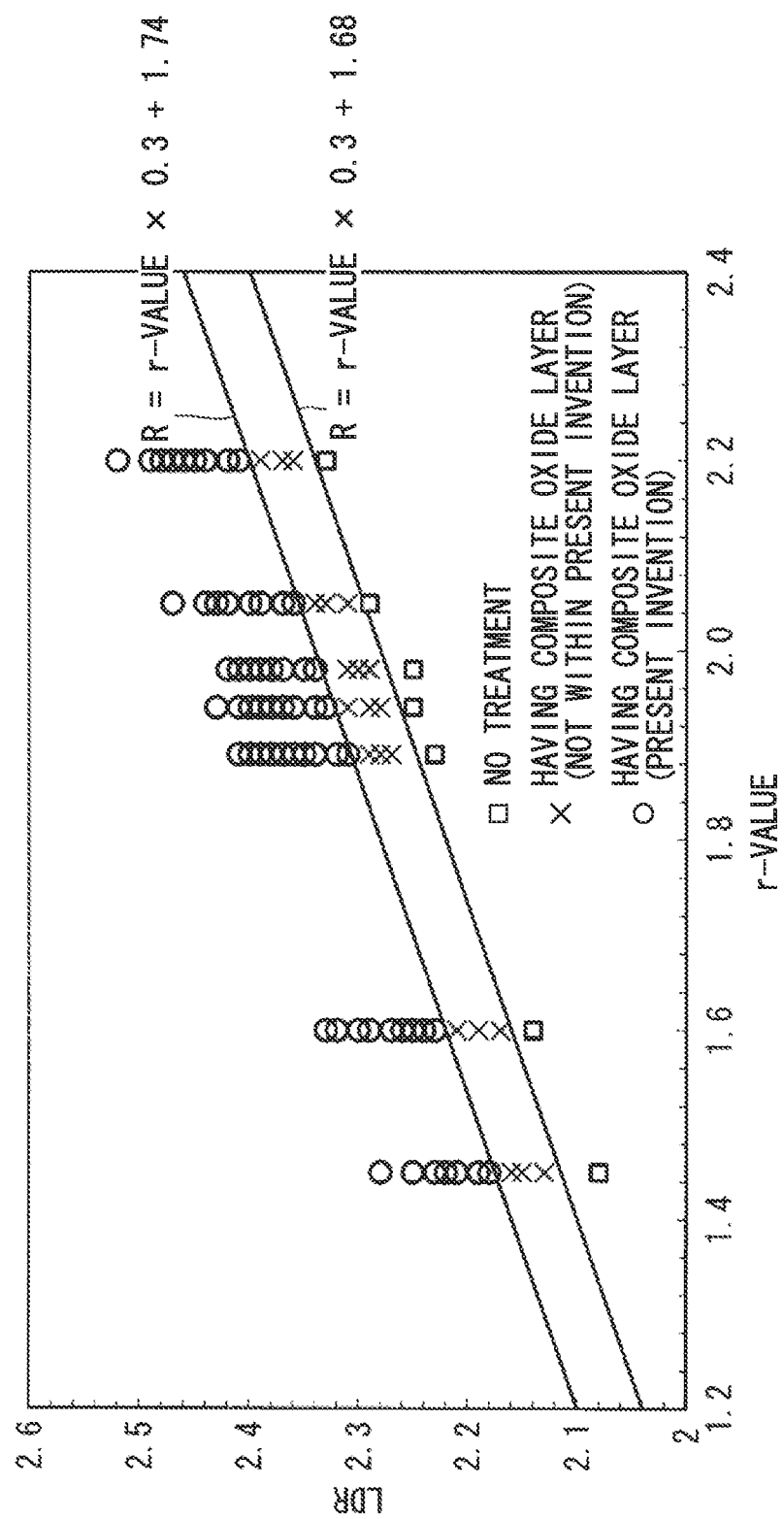
FIG. 1 is a graph showing the relationship between the limiting drawing ratio (LDR) and r-value of a galvannealed steel sheet.

For a non-treated galvannealed steel sheet and for the galvannealed steel sheet having the composite oxide layer 5 of Mn, Zn, and P formed thereon, test results of relationships between r-value and limiting drawing ratio R obtained by the TZP test are shown in FIG. 1. As shown by FIG. 1 (open squares □), the limiting drawing ratios R of the non-treated galvannealed steel sheet do not satisfy Formula (1) and all are in the range of Formula (2).

$$R < 0.3 \times r + 1.68 \quad (2)$$

The galvannealed steel sheet that satisfies Formula (2) cannot sufficiently exhibit formability (Lankford value) of the galvannealed steel sheet (or the base steel sheet) and has insufficient deep drawability (formability in consideration of contact with the die). In addition, as shown by FIG. 1 (open circles ○), the composite oxide layer 5 of Mn, Zn, and P is formed on the galvannealed steel sheet to satisfy Formula (1), and thus the r-value of the galvannealed steel sheet is increased by 0.2 or higher, thereby ensuring the deep drawability corresponding to the r-value. As described above, by forming the composite oxide layer 5 according to the embodiment, the same formability enhancement effect as the case where a galvannealed steel sheet (or a base steel sheet) having a higher r-value is used can be obtained. In the embodiment, when an increase in the formability enhancement effect in terms of r-value is smaller than 0.2, the enhancement of formability needed for processing at high surface pressure is insufficient, so that Formula (1) needs to be satisfied. As shown by FIG. 1(crosses X), when the condition of the flat portion 3 and the formed composite oxide layer 5 described above is not satisfied, the limiting drawing ratio R of the galvannealed steel sheet does not satisfy Formula (1) and is in the range of Formula (3).

$$0.3 \times r + 1.68 \leq R < 0.3 \times r + 1.74 \quad (3)$$

A galvannealed steel sheet that satisfies Formula (3) has insufficient deep drawability as described above in consideration of the costs needed to form the oxide layer.

Therefore, in the embodiment, by selecting the galvannealed steel sheet 10 on which the composite oxide layer 5 is formed so as to satisfy Formula (1), the galvannealed steel sheet having excellent deep drawability can be provided. In addition, in order to reduce the costs needed to form the oxide layer and increase types of selectable galvannealed steel sheets for processing under high surface pressure, it is preferable that the limiting drawing ratio R of the galvannealed steel sheet satisfy Formula (4).

$$R \geq 0.3 \times r + 1.77 \quad (4)$$

As the composite oxide layer 5 of Mn, Zn, and P is formed on the surface of the galvannealed layer 2, deep drawability of the galvannealed steel sheet 10 is enhanced. It is thought that this is because inflow resistance of the sheet material to the vertical wall portion of the die from a blank holding portion is reduced by the effect of the composite oxide layer 5 of Mn, Zn, and P (enhancement of lubricity). In this case, when the area ratio of the flat portion 3 is small, surface pressure applied to the flat portion 3 from the die is too high. Accordingly, when the galvannealed layer is deformed and a surface newly formed due to the deformation comes in contact with the die, the effect of the composite oxide layer 5 of Mn, Zn, and P (enhancement of the lubricity) cannot be exhibited. Therefore, it is thought that deep drawability under high surface pressure is significantly enhanced by forming the composite oxide layer 5 of Mn, Zn, and P on the surface of the galvannealed layer 2 in which the area ratio of the flat portion 3 is 10 to 70%.

In addition, as the coated amount of the mixed layer of the composite oxide of Mn, Zn, and P and the aqueous P compound is increased, the formability enhancement effect is also increased. On the other hand, an increase in the coated amount of the aqueous P compound is linked to a reduction in adhesion. Therefore, in the case where the mixed layer of the composite oxide of Mn, Zn, and P and the aqueous P compound is to be formed, in order to exhibit both high formability and adhesion, it is preferable that the ratio of the area in which the P content in the composite oxide layer 5 of Mn, Zn, and P is equal to or greater than 20 mg/m$^2$ to the total area (percentage of the composite oxide layer 5 of Mn, Zn, and P to the total surface area) be equal to or higher than 20% and equal to or lower than 80%.

When the ratio of the area in which the P content is equal to or greater than 20 mg/m$^2$ to the total area is equal to or higher than 20%, formability is further enhanced. Accordingly, it is preferable that the ratio of the area in which the P content in the composite oxide layer 5 of Mn, Zn, and P is equal to or greater than 20 mg/m$^2$ to the total area be equal to or higher than 20%. On the other hand, when the ratio of the area in which the P content is equal to or greater than 20 mg/m$^2$ to the total area is higher than 80%, adhesion strength of the composite oxide layer 5 of Mn, Zn, and P is degraded. Accordingly, it is preferable that the ratio of the area in which the P content in the composite oxide layer 5 of Mn, Zn, and P to the total area is equal to or greater than 20 mg/m$^2$ be equal to or lower than 80%. Particularly, when an adhesive having low adhesion is used, the ratio of the area in which the P content is equal to or greater than 20 mg/m$^2$ to the total area is more preferably equal to or higher than 20% and equal to or lower than 60%, and most preferably equal to or higher than 30% and equal to or lower than 60%.

In addition, P has a great effect on enhancing lubricity. That is, with increase in the P/Mn ratio, the formability enhancement effect is increased. However, with decrease in the P/Mn ratio, adhesion is enhanced. Therefore, in order to exhibit both high formability and adhesion, the ratio of the area in which the P/Mn ratio in the composite oxide of Mn, Zn, and P is equal to or higher than 3 to the total area (percentage of the composite oxide layer 5 of Mn, Zn, and P to the total surface area) is preferably equal to or higher than 1% and equal to or lower than 50%, more preferably equal to or higher than 2% and equal to or lower than 40%, and most preferably equal to or higher than 5% and equal to or lower than 30%.

When the ratio of the area in which the P/Mn ratio is equal to or higher than 3 to the total area is equal to or higher than 1%, formability is sufficiently enhanced. Accordingly, it is preferable that the ratio of the area in which the P/Mn ratio in the composite oxide layer 5 of Mn, Zn, and P is equal to or higher than 3 to the total area be equal to or higher than 1%. In addition, when the ratio of the area in which the P/Mn ratio is equal to or higher than 3 to the total area is higher than 50%, sufficient adhesion strength cannot be ensured. Accordingly, it is preferable that the ratio of the area in which the P/Mn ratio in the composite oxide layer 5 of Mn, Zn, and P is equal to or higher than 3 to the total area be equal to or lower than 50%.

As described above, by forming the mixed layer of the composite oxide of Mn, Zn, and P and the aqueous P compound, inflow resistance at a portion under high surface pressure is reduced and thus formability at high surface pressure is enhanced. Therefore, it is preferable that the aqueous P compound be included in the composite oxide layer 5.

It is preferable that the ratio of the aqueous P compound to the composite oxide layer 5 of Mn, Zn, and P be 1 to 50%. When the ratio of the aqueous P compound is equal to or higher than 1%, the formability enhancement effect is sufficient. In addition, when the ratio of the aqueous P compound is equal to or lower than 50%, sufficient adhesion can be ensured. Particularly, when both high formability and adhesion need to be exhibited, the ratio of the aqueous P compound is preferably equal to or higher than 10% and equal to or lower than 45%, and more preferably, equal to or higher than 15% and equal to or lower than 40%.

The effect of the composite oxide layer 5 is increased by the synergy effect of formability as the deep drawability of the base steel sheet is enhanced. Accordingly, a higher r-value of the base steel sheet is preferable. Therefore, it is preferable that C of the base steel sheet of a component having a complex shape that requires high formability be reduced to an extremely low level to increase the r-value of the base steel sheet.

Particularly, it is preferable that an ultra low carbon steel sheet containing an amount equal to or more than 0.0001% and equal to or less than 0.004% of C, an amount equal to or more than 0.001% and equal to or less than 0.15% of Si, an amount equal to or more than 0.01% and equal to or less than 1.0% of Mn, an amount equal to or more than 0.001% and equal to or less than 0.1% of P, an amount equal to or less than 0.015% of S, an amount equal to or more than 0.001% and equal to or less than 0.1% of Al, an amount equal to or more than 0.002% and equal to or less than 0.10% of Ti, an amount equal to or more than 0.0005% and equal to or less than 0.004% of N, and the balance composed of Fe and inevitable impurities, be used.

The reason why the preferable range of each component in the ultra low carbon steel sheet according to the embodiment is limited is as follows.

C is an element for increasing the strength of steel, and containing an amount equal to or more than 0.0001% of C is preferable and containing an amount equal to or more than 0.0005% of C is more preferable. However, with an increase in the C content, strength is increased and formability is degraded. Accordingly, in order to exhibit both sufficient strength and sufficient formability, it is preferable that the upper limit of the C content be 0.004%. When a particularly high formability is needed, it is more preferable that the C content be equal to or lower than 0.003%. When a particularly complex press-forming is needed, it is most preferable that the C content be equal to or lower than 0.002%.

Si is also an element for increasing the strength of steel, and an amount equal to or more than 0.001% of Si is contained. However, with an increase in the Si content, formability and the hot dip galvanizing property of the base steel sheet is degraded. Accordingly, in order to ensure sufficient strength, sufficient formability, and a sufficient hot dip galvanizing property, it is preferable that the upper limit of the Si content be 0.15%. When a particularly high formability is needed, the Si content is more preferably equal to or less than 0.10%, and most preferably equal to or less than 0.05%.

Mn is an element also for increasing the strength of steel and thus degrades formability. In order to ensure sufficient formability, the upper limit of the Mn content is preferably 1.0%, and more preferably 0.5%. With a reduction in Mn, formability of the steel sheet is enhanced. However, in order to allow the Mn content to be less than 0.01%, high refining costs are needed. Accordingly, the lower limit of the Mn content is preferably 0.01%, and more preferably 0.03%.

P is also an element for increasing the strength of steel and thus degrades formability. In order to ensure sufficient formability, the upper limit of the P content is preferably 0.1%. With a reduction in P, formability of the steel sheet is enhanced. Therefore, when a particularly high formability is needed, it is more preferable that the P content be equal to or less than 0.010%. However, in order to allow the P content to be less than 0.001%, very high refining costs are needed. Accordingly, the lower limit of the P content is preferably 0.001%. In consideration of the balance between strength, formability, and costs, the P content is more preferably 0.003 to 0.010%.

S is an element that degrades the hot workability and corrosion resistance of steel. Accordingly, a smaller S content is preferable. Therefore, it is preferable that the upper limit of the S content be 0.015%. In addition, it is more preferable that the S content be equal to or less than 0.010%. Here, in order to reduce the S content in ultra low carbon steel, high refining costs are needed. In addition, in view of formability and plating adhesion, there is no need to excessively reduce S. Accordingly, S may be reduced to a level needed for steel sheet properties such as hot workability and corrosion resistance. Since it is difficult to completely remove S, the range of possible S content does not include 0.

Al is a deoxidizing element of steel and needs to be contained at a predetermined amount or higher. In order to sufficiently perform deoxidizing of steel, the Al content is preferably equal to or more than 0.001%, and more preferably, equal to or more than 0.005%. However, when an excessive amount of Al is contained, a coarse non-metallic inclusion is generated and thus formability may be degraded. In order to prevent the generation of a coarse non-metallic inclusion, it is preferable that the upper limit of the Al content be 0.1%. In addition, in view of good steel sheet quality, it is more preferable that the Al content be equal to or less than 0.070%.

In order to fix C and N in steel as carbide and nitride, it is preferable that an amount equal to or more than 0.002% of Ti be added. Since Ti is an element for increasing the r-value of the steel sheet, a larger amount of Ti added is preferable. In order to sufficiently increase the r-value of the steel sheet, it is more preferable that an amount equal to or more than 0.010% of Ti be contained. On the other hand, when more than 0.10% of Ti is added, the effect of increasing the r-value of the steel sheet is reduced. Accordingly, in order to suppress costs needed to add alloys, it is preferable that the upper limit of the Ti content be 0.10%. In order to ensure formability of the steel sheet and surface quality by limiting the amount of solute Ti, it is more preferable that the Ti content be equal to or less than 0.050%.

N is an element for increasing the strength of steel and thus degrades formability. In order to ensure sufficient formability, the upper limit of the N content is preferably 0.0045%. When a particularly high formability is needed, the N content is more preferably equal to or less than 0.003%, and more preferably equal to or less than 0.002%. A lower amount of N is preferable in view of formability of the steel sheet. However, in order to reduce the N content to be less than 0.0005%, excessive costs are needed. Accordingly, the lower limit of the N content is preferably 0.0005%.

In the embodiment, in addition to the components described above, in order to fix C and N in steel as carbide and nitride, Nb may be added after adding Ti described above as an additional component. In order to sufficiently exhibit the fixing effect of C and N due to the addition of Nb, adding an amount equal to or more than 0.002% of Nb is preferable, and containing an amount equal to or more than 0.005% of Nb is more preferable. When more than 0.10% of Nb is added, the fixing effect of C and N is reduced. Accordingly, in order to suppress the costs of alloy additives, it is preferable that the upper limit of the Nb content be 0.10%. In order to limit an increase in the recrystallization temperature of the steel sheet and ensure productivity of a hot dip galvanization line, it is more preferable that the Nb content be equal to or less than 0.050%.

In the embodiment, as an additional component for improving secondary workability, 0.0001 to 0.003% of B may be contained in the steel sheet. That is, in order to sufficiently improve secondary workability, it is preferable that the B content be equal to or more than 0.0001%. When more than 0.003% of B is added, there may be the case where the effect of improving secondary workability is reduced and thus formability is degraded. Accordingly, when B is added, it is preferable that the B content be equal to or less than 0.003%. Particularly, when high deep drawability is needed, it is more preferable that the B content be equal to or less than 0.0015%.

In the embodiment, the O (oxygen) content in the steel sheet is not particularly limited. However, there may be the case where O generates an oxide-based inclusion and thus degrades the formability and corrosion resistance of the steel. Accordingly, it is preferable that the O content be equal to or less than 0.007%. A smaller amount of the O content is preferable in view of formability and corrosion resistance of steel.

In addition, for the purpose of further improving corrosion resistance and hot workability of the steel sheet itself, or as inevitable impurities from auxiliary materials such as scrap, the steel sheet in the embodiment may contain as well as the above-mentioned components, other alloy elements. As the alloy elements, there are Cu, Ni, Cr, Mo, W, Co, Ca, Y, Ce, La, Nd, Pr, Sm, V, Zr, Ta, Hf, Pb, Sn, Zn, Mg, As, Sb, and Bi. For example, when the total content of such other alloy elements is equal to or less than 1% (including 0%), formability of the steel sheet is sufficient. Therefore, even though an amount equal to or less than 1% of the above-mentioned other alloy elements is included in the steel sheet, this does not depart from the scope of the present invention.

It is preferable that the r-value of the ultra low carbon steel sheet be 1.6 to 2.2. When the r-value is equal to or higher than 1.6, sufficient plastic anisotropy is exhibited, and thus deep drawability of the steel sheet itself is good. Accordingly, it is preferable that the r-value be equal to or higher than 1.6. In addition, in consideration of the costs needed for production and industrial production difficulty, the r-value may be equal to or lower than 2.2.

On the other hand, in a high-strength steel sheet, the C content contained in steel is generally high, and thus deformation around hard phases included in steel is inhomogeneous, so that it is difficult to obtain a high r-value. As a method for improving deep drawability and formability of a steel sheet having such a low r-value, forming the composite oxide layer 5 of Mn, Zn, and P on the galvannealed layer 2 is effective. By forming the composite oxide layer 5 of Mn, Zn, and P on the high-strength galvannealed steel sheet, the high-strength steel sheet can be used for a component having a complex shape that could not be applied with a high-strength steel sheet until now.

Specifically, it is preferable that a steel sheet containing by mass an amount more than 0.004% and equal to or less than 0.3% of C, an amount equal to or more than 0.001% and equal to or less than 2% of Si, an amount equal to or more than 0.01% and equal to or less than 4.0% of Mn, an amount equal to or more than 0.001% and equal to or less than 0.15% of P, an amount equal to or less than 0.015% of S, an amount equal to or more than 0.001% and equal to or less than 2% of Al, an amount equal to or more than 0.0005% and equal to or less than 0.004% of N, and the balance composed of Fe and inevitable impurities be used.

As described above, the reason why the preferable range of each component in the high-strength steel sheet is limited is as follows.

C is an element for increasing the strength of steel, and it is preferable more than 0.004% of C be contained for the purpose of increasing the tensile strength of the steel sheet. As the amount of C added is increased, the ratio of the hard structure in the steel sheet is increased, and strength is also increased, so that a larger amount of added C is preferable. However, in order to ensure formability, the upper limit of the C content is preferably 0.3%, and more preferably, 0.2%.

Si is an element for increasing strength without significantly degrading formability of the steel sheet, and particularly, elongation, and it is preferable that an amount equal to or more than 0.001% of Si be added. In addition, with an increase in the Si content, strength is increased, and thus ductility is degraded. Particularly, when the Si content is higher than 2.0%, the effect of increasing strength is saturated, and only degradation of ductility occurs. Accordingly, in order to increase strength and ensure ductility, it is preferable that the upper limit of the Si content be 2.0%. In consideration of the balance between strength and ductility, it is preferable that the Si content be equal to or more than 0.1% and equal to or less than 2.0%.

Mn is added to increase the strength of the steel sheet. However, when the Mn content is excessive, cracking easily occurs in a slab, and spot weldability deteriorates. Accordingly, the upper limit of the Mn content is preferably 4.0%, and more preferably 3.0%. In addition, as the Mn content is reduced, better formability is exhibited. However, in order to allow the Mn content to be less than 0.01%, high refining costs are needed. Accordingly, it is preferable that the lower limit of the Mn content be 0.01%. In addition, in order to obtain a steel sheet having both strength and formability such as a composite structure steel sheet, it is preferable that the Mn content be equal to or more than 1.5%.

P is added as an element for increasing the strength without significantly degrading formability of the steel sheet, and particularly, elongation. Here, when P is excessively added, intergranular embrittlement due to intergranular segregation and deterioration of weldability occur. Accordingly, it is preferable that the suitable range of the P content be equal to or less than 0.15%. In order to reduce the P content to be less than 0.001%, high refining costs are needed. Accordingly, it is preferable that the lower limit of the P content be 0.001%. In terms of the balance between strength, formability, and costs, it is more preferable that the P content be 0.02 to 0.1%.

S is an element that degrades hot workability and corrosion resistance of steel. Accordingly, a smaller S content is preferable. Therefore, it is preferable that the upper limit of the S content be 0.015%. In addition, it is more preferable that the S content be equal to or less than 0.010%. Here, in order to reduce the S content in low carbon steel (high-strength steel), high refining costs are needed. In addition, in view of formability and plating adhesion, there is no need to excessively reduce S. Accordingly, S may be reduced to a level needed for steel sheet properties such as hot workability and corrosion resistance.

Al accelerates ferrite formation in a steel structure and thus enhances ductility. However, when Al is excessively added, the above-described effect is saturated, and the amount of an inclusion becomes too high, so that hole expandability is deteriorated. Accordingly, it is preferable that the upper limit of the Al content be 2.0%. The lower limit of the Al content is not particularly limited. Since it is difficult to allow the Al content to be less than 0.0005%, the lower limit of the Al content may be 0.0005%. In addition, in order to apply Al as a deoxidizing material, the lower limit of the Al content may be equal to or more than 0.001%.

N forms coarse nitride and deteriorates bendability and hole expandability. Accordingly, there is a need to suppress the N content. Specifically, in order to suppress the formation of coarse nitride and ensure bendability and hole expandability, it is preferable that the range of the N content be equal to or less than 0.004%. Furthermore, N is a cause of blowhole generation in welding, so that a lower amount of N is better. The lower limit of the N content does not influence the effect of the embodiment, and thus is not particularly limited. When the N content is less than 0.0005%, there may be the case where production costs are significantly increased. Accordingly, the lower limit of the N content may be 0.0005%.

In addition, for the purpose of further improving corrosion resistance and hot workability of the steel sheet itself, or as inevitable impurities from auxiliary materials such as scrap, the steel sheet in the embodiment may contain as well as the above-mentioned components, other alloy elements. As the alloy elements, there are Ti, Nb, B, Cu, Ni, Cr, Mo, W, Co, Ca, Y, Ce, La, Nd, Pr, Sm, V, Zr, Ta, Hf, Pb, Sn, Zn, Mg, As, Sb, and Bi. For example, when the total content of such other alloy elements is equal to or less than 1% (including 0%), formability of the steel sheet is sufficient. Therefore, even though an amount equal to or less than 1% of the above-mentioned other alloy elements is included in the steel sheet, this does not depart from the scope of the present invention.

The steel sheet 1 (base steel sheet) according to the embodiment may be produced by applying a typical producing process for a hot-rolled steel sheet (hot strip) or a cold-rolled steel sheet (cold strip). The steel sheet 1 according to the embodiment which is any of the cold-rolled steel sheet and the hot-rolled steel sheet sufficiently exhibits the effect of enhancing deep drawability, and thus is not significantly changed by the history (production process) of the steel sheet. In addition, as for production conditions such as a hot rolling condition, a cold rolling condition, and an annealing condition, predetermined conditions may be selected in response to dimensions of the steel sheet 1 and necessary strength. The effect of enhancing deep drawability or the like is not damaged by the production conditions such as the hot rolling condition, the cold rolling condition, and the annealing condition.

Further, the thickness of the steel sheet 1 does not result in limitations of the embodiment. A steel sheet having a thickness that is typically allowed can apply the embodiment.

The forming method of the galvanized layer is not particularly limited. For example, in order to form the galvanized layer, typical hot dip galvanization using a non-oxidation furnace system or an all-radiant system may be applied. In addition, the alloying conditions are not particularly determined. In the alloying conditions, for example, ranges of a treatment temperature of 460 to 600° C. and a treatment time of 10 to 90 seconds are suitable in practical operations.

The galvannealed steel sheet after being subjected to alloying is subjected to skin pass rolling for the purpose of suppressing generation of stretcher strain. In skin pass rolling, the protruded portion 23 which is a portion of the galvannealed surface is subjected to compressive deformation by a mill roll, and as illustrated in FIG. 2B, the flat portion 3 is formed in the protruded portion 23 which is a portion of the galvannealed surface. Moreover, a depressed part which is a portion of the galvannealed surface is not subjected to compressive deformation, and thus remains on the galvannealed surface as the rough portion 4. In order to allow the area ratio of the flat portion 3 on the galvannealed surface to be equal to or higher than 10%, it is preferable that a roll having a work roll diameter of equal to or smaller than 700 mm be used to perform skin pass rolling at an elongation rate of equal to or higher than 0.3%.

The area ratio of the flat portion is determined according to rolling reduction per unit area. However, the rolling reduction per unit area is reduced as the work roll diameter is increased under a constant rolling force. Accordingly, when the work roll diameter is greater than 700 mm, a high rolling force is needed to obtain a target area ratio, and thus the quality of the galvannealed steel sheet deteriorates. Therefore, it is preferable that the work roll diameter be equal to or smaller than 700 mm. In addition, as the work roll diameter is reduced, the rolling reduction per unit area is increased, and thus the flat portion 3 having a larger area ratio can be obtained under the same rolling force. Accordingly, a smaller work roll diameter is preferable, and a work roll diameter of equal to or smaller than 600 mm is more preferable.

In the same manner, in order to obtain the flat portion 3 having an area ratio of equal to or higher than 10%, it is preferable that the elongation ratio (in skin pass rolling, in order to increase precision of sheet thickness, the elongation ratio is used instead of the rolling reduction ratio as the deformation degree) be equal to or higher than 0.3%.

On the other hand, when the ratio 2R/t of the work roll diameter (2R) to the thickness (t) of a steel strip (the galvannealed steel sheet) is lower than 400, a desired surface profile cannot be obtained. Therefore, the work roll diameter is set to be equal to or greater than 300 mm.

In addition, when the elongation ratio is too high, the quality of the galvannealed steel sheet deteriorates, so that it is preferable that the elongation ratio be equal to or lower than 2.0%.

The type of roll is not particularly prescribed. In order to easily obtain a flat galvannealed surface, a bright roll is preferably used instead of a dull roll. Particularly, when a bright roll having a roughness of smaller than 0.5 μm is used, the flat portion 3 having a surface roughness Ra of smaller than 0.5 μm can be easily produced. Accordingly, the bright roll having a roughness of smaller than 0.5 μm is more preferably used.

Thereafter, the composite oxide layer 5 of Mn, Zn, and P is formed on the surface (one surface or all surfaces) of the galvannealed layer. In order to form the composite oxide layer 5 according to the embodiment, potassium permanganate and at least one of phosphoric acid, phosphorous acid, and hypophosphorous acid are combined with the treatment liquid, and the resultant treatment liquid may be allowed to react with the galvannealed steel sheet. Due to the reaction between the galvannealed steel sheet and the treatment liquid, dissolution of Zn and reduction of permanganate ions occur, and thus the pH at the reaction interface rapidly increases. A film mainly contained Mn oxide or Mn hydroxide is formed at the reaction interface, the pH at the reaction interface is decreased due to the film formation, and the formed film is hydrolyzed. Due to the hydrolysis, the Mn oxide or the Mn hydroxide is changed into phosphate, phosphite, or hypophosphite having a lower solubility, and a film is re-formed. This repetition (reaction cycle of dissolution, reduction, and hydrolysis) occurs within a short time thereby obtaining the composite oxide layer 5 of Mn, Zn, and P. Moreover, in order to apply the treatment liquid, a coater (roll coater) may be used. In this case, in order to control the amount of the treatment liquid applied, for example, slits may be provided in the coater and a gap therebetween (groove width, groove ratio) may be adjusted. In the above-described method, for example, by controlling the amount of the treatment liquid, the thickness of the composite oxide layer 5 of Mn, Zn, and P may be controlled.

In addition, the composite oxide layer 5 of Mn, Zn, and P may be formed on the surface of the galvannealed steel sheet by a contact method such as immersion or application or an electrochemical method such as electrolysis performed at a current density of 5 to 60 A/dm². In addition, as needed, before forming an inorganic oxide (composite oxide), the galvannealed steel sheet may be subjected to preprocessing by a chemical method using an alkali or acid or a physical method using a brush.

In order to exhibit both high formability and adhesion, the ratio (percentage of the composite oxide layer 5 of Mn, Zn, and P to the total surface area) of the area in which the P content in the composite oxide layer 5 of Mn, Zn, and P is equal to or greater than 20 mg/m² to the total area may be equal to or higher than 20% and equal to or lower than 80%. In this case, for example, in order to allow a suitable amount of the aqueous phosphorous compound to remain in the composite oxide layer 5, a roll coater having a groove width of equal to or greater than 0.1 mm and equal to or smaller than 5 mm and a groove ratio of equal to or higher than 1% and equal to or lower than 50% may be used. Since a large amount of the treatment liquid is supplied to the groove portion of the roll coater, the thickness of the composite oxide layer 5 of Mn, Zn, and P on the surface portion of the galvannealed layer 2 corresponding to the groove portion is increased.

In addition, after forming the composite oxide layer 5 of Mn, Zn, and P, skin pass rolling may be performed again.

Collectively, the galvannealed steel sheet 10 may be produced by the following method. That is, the steel sheet 1 is subjected to hot dip galvanization and alloying to form the galvannealed layer 2 including an amount equal to or more than 0.05% and equal to or less than 0.5% of Al and an amount equal to or more than 6% and equal to or less than 12% of Fe. After skin pass rolling, the composite oxide layer 5 of Mn, Zn, and P is formed on the surface of the galvannealed layer 2 by controlling the treatment liquid so that the composite oxide layer 5 of Mn, Zn, and P includes an amount equal to or more than 0.1 mg/m² and equal to or less than 100 mg/m² of Mn, an amount equal to or more than 1 mg/m² and equal to or less than 100 mg/m² of P and the P/Mn ratio is 0.3 to 50. Here, it is preferable that skin pass rolling be performed to achieve an elongation ratio of equal to or higher than 0.3% and equal to or lower than 2.0% using a roll having a work roll diameter of equal to or greater than 300 mm and equal to or smaller than 700 mm. In addition, it is preferable that a bright roll having a roughness of smaller than 0.5 μm be used in the skin pass rolling. It is preferable that the treatment liquid include potassium permanganate and at least one of phosphoric acid, phosphorous acid, and hypophosphorous acid. Moreover, it is preferable that the treatment liquid be applied on the surface of the galvannealed layer 2 using the roll coater.

EXAMPLES

Hereinafter, the galvannealed steel sheet 10 according to the embodiment will be described in detail using Examples.

Example 1

A slab having a composition of Table 1 (ultra low carbon steel) was heated to 1150° C. and subjected to hot rolling at a finishing temperature of 910 to 930° C. to produce a hot-rolled steel strip of 4 mm, and the hot-rolled steel strip was wound up at 680 to 720° C. After performing acid washing, cold rolling was performed on the hot-rolled steel strip to produce a cold-rolled steel strip of 0.8 mm. Moreover, using continuous hot dip galvanizing equipment in an in-line annealing system, annealing, galvanizing, and alloying were performed on the cold-rolled steel strip, thereby producing a galvannealed steel sheet. In the galvannealing process, the annealing atmosphere was a mixed gas of 5 vol % of hydrogen and 95 vol % of nitrogen, the annealing temperature was 800 to 840° C., and the annealing time was 90 seconds. As the hot dip galvanizing bath, a hot dip galvanizing bath having an effective Al concentration of 0.105% (Al concentration that can be used as metal) was used, and the amount of zinc was controlled to 50 g/m² using a gas wiper. During heating in alloying, heating equipment in an induction heating system was used to perform the alloying at 440 to 550° C. In skin pass rolling, the bright roll having a work roll diameter of 480 mm was used. Moreover, skin pass rolling was performed on each galvannealed steel sheet to achieve elongation ratios shown in Tables 3, 5, 7, 9, 11, 13, and 15.

Furthermore, treatment liquids in which the concentration of potassium permanganate and the concentration of phosphoric acid were different were applied to the galvannealed steel sheets to allow the galvannealed layer on the galvannealed surface to react with the treatment liquids, thereby producing composite oxide layers of Mn, Zn, and P. The coated amount of the treatment liquid was controlled by changing the amount of the treatment liquid applied.

The Fe concentration Fe % and the Al concentration Al % in the galvannealed layer, and the P content and the Mn content in the composite oxide layer of Mn, Zn, and P were obtained by dissolving the galvannealed layer using hydrochloride including an inhibitor for analysis and by measuring components in the galvannealed layer using an ICP (Inductively-Coupled Plasma) method.

The thickness of the composite oxide layer of Mn, Zn, and P was obtained by measuring the profile in the depth direction (Auger electron spectrum of Mn, P, and O) using Ar sputtering and AES (Auger Electron Spectroscopy) and converting the sputtering time at which peaks of all Mn, P, and O are equal to or smaller than half the maximum values into sputtering distance.

With regard to the kinds of the P compounds in the composite oxide layer of Mn, Zn, and P, existence of $PO_4^{3-}$ was confirmed using a phosphorus molybdenum blue method.

The amount of each phase (η phase, ζ phase, Γ phase) in the galvannealed layer of the galvannealed steel sheet was evaluated by measuring the X-ray diffraction intensity of each phase by X-ray diffractometry and by using the ratio (Iη/ISi, Iζ/ISi, and IΓ/ISi) of the X-ray diffraction intensity of each phase to the X-ray diffraction intensity ISi of an interplanar spacing d of 3.13 Å of a Si powder standard.

Moreover, as described above, the X-ray diffraction intensity IΙΙ of an interplanar spacing d of 1.237 Å was used for the η phase, the X-ray diffraction intensity Iζ of an interplanar spacing d of 1.26 Å was used for the ζ phase, and the X-ray diffraction intensity IΓ of an interplanar spacing d of 1.222 Å was used for the Γ phase.

In addition, by performing a tensile test on each galvannealed steel sheet, as indexes of formability, strength (tensile strength), elongation (tensile elongation), and Lankford value r (as the r-value, the average (average in each sampling direction) of an r-value of 0°, an r-value of 45°, and an r-value of 90° was used) were measured.

The area ratio of the flat portion on the galvannealed surface was obtained by taking the image of the galvannealed surface using an SEM (Scanning Electron Microscope) and calculating the area ratio of the flat portion using an image processing apparatus. Ranges of 500×400 µm at 5 points from arbitrary positions were taken using the SEM, and the average of the area ratios of the SEM images was used as a representative value.

The surface roughness Ra of the flat portion and the surface roughness Ra of the rough portion (recessed portion) could be obtained by measuring the arithmetic average roughness Ra (JIS B0601:1994) of a range of 10 µm×10 µm using a laser microscope (VK-9700 produced by KEYENCE) at 10 points and averaging the measured values. With regard to the flat portion, when the average of the arithmetic average roughnesses Ra was equal to or greater than 0.01 µm and smaller than 0.35 µm, the surface roughness was evaluated as G (Good). In addition, when the average of the arithmetic average roughnesses Ra was not equal to or greater than 0.01 µm and smaller than 0.35 µm, the surface roughness was evaluated as B (Bad). With regard to the rough portion, when the average of the arithmetic average roughnesses Ra was equal to or greater than 0.5 µm and equal to or smaller than 10 µm, the surface roughness was evaluated as G (Good). In addition, when the average of the arithmetic average roughnesses Ra was not equal to or greater than 0.5 µm and equal to or smaller than 10 µm, the surface roughness was evaluated as B (Bad).

With regard to deep drawability, by performing a TZP test having the following conditions, the blank diameter at which the forming allowance of Formula (5) became 0 was evaluated as the limiting drawing ratio (LDR) R.

Blank diameter ($D_0$): φ90 to φ125 mm
Tool size:
Punch diameter ($D_0$): φ50 mm, punch shoulder radius r: 5 mm
Die hole diameter: φ51.6 mm, die shoulder radius r: 5 mm
BHF (blank holding force):
In measurement of forming load (P): 25 kN
In measurement of fracture load ($P_f$): 200 kN
Lubricating oil: rust-resistant oil
Evaluated value: forming allowance T $$T=(P_f-P)/P_f \quad (5)$$

The results are shown in Tables 2 to 15. In Comparative Examples Nos. 1, 16, 31, 46, 61, 76, 91, 106, and 121, galvannealed steel sheets in which composite oxides of Mn, Zn, and P were not formed were used. Accordingly, such comparative examples did not satisfy Formula (1). In Comparative Examples Nos. 4, 19, 34, 49, 64, 79, 94, 109, 113, and 124, P contents in the composite oxide layers were less than 1 mg/m$^2$ or more than 100 mg/m$^2$, so that Formula (1) was not satisfied. In Comparative Examples Nos. 8, 23, 38, 53, 68, 83, 98, 113, and 128, Mn contents in the composite oxide layers were less than 0.1 mg/m$^2$ or more than 100 mg/m$^2$, so that Formula (1) was not satisfied. In Comparative Examples Nos. 11, 26, 41, 56, 71, 86, 101, 116, and 131, the area ratios of the flat portions were lower than 10%, so that Formula (1) was not satisfied.

In examples excluding the above-mentioned numbers (comparative examples), galvannealed steel sheets having galvannealed layers which have sufficient area ratios of flat portions and composite oxide layers which have sufficient Mn contents and P contents were used. Accordingly, the galvannealed steel sheets according to the embodiment satisfied Formula (1) and were excellent in deep drawability. In the examples, as compared with comparative examples in which the composite oxides of Mn, Zn, and P were not applied to the galvannealed surface layers, the limiting drawing ratio R was increased by 0.06 to 0.3. In comparison of the results of Tables 2 to 15 with reference to FIG. 1, the increment in the limiting drawing ratio R corresponds to the fact that the increment (deep drawability enhancement effect) in the r-value was 0.2 to 1.0.

TABLE 1

| | Chemical Composition (mass %) | | | | | | | | | |
|---|---|---|---|---|---|---|---|---|---|---|
| Symbol | C | Si | Mn | P | S | Al | Ti | Nb | N | B |
| A | 0.0018 | 0.002 | 0.06 | 0.011 | 0.007 | 0.027 | 0.033 | — | 0.0022 | 0.0002 |
| B | 0.0006 | 0.002 | 0.06 | 0.010 | 0.004 | 0.048 | 0.024 | — | 0.0016 | — |
| C | 0.0010 | 0.003 | 0.07 | 0.004 | 0.007 | 0.028 | 0.032 | 0.009 | 0.0017 | — |
| D | 0.0009 | 0.006 | 0.03 | 0.005 | 0.004 | 0.032 | 0.011 | 0.027 | 0.0014 | 0.0004 |
| E | 0.0005 | 0.009 | 0.02 | 0.004 | 0.006 | 0.026 | 0.025 | 0.009 | 0.0018 | — |
| F | 0.0025 | 0.004 | 0.11 | 0.010 | 0.006 | 0.031 | 0.029 | 0.010 | 0.0039 | — |
| G | 0.0014 | 0.008 | 0.16 | 0.016 | 0.005 | 0.027 | 0.027 | 0.029 | 0.0014 | — |
| H | 0.0018 | 0.130 | 0.05 | 0.009 | 0.006 | 0.027 | 0.021 | 0.038 | 0.0022 | — |
| I | 0.0032 | 0.009 | 0.08 | 0.013 | 0.007 | 0.033 | 0.012 | 0.007 | 0.0042 | — |

TABLE 2

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | Iη/ISi (—) | Iζ/ISi (—) | IΓ/ISi (—) | | | P Content (mg/m$^2$) | Mn Content (mg/m$^2$) | P/Mn (—) | Thickness (nm) | Kind of P Compound |
| 1 | Steel Sheet A | 10.6 | 0.25 | 0 | 0.0015 | 0.0005 | G | G | — | — | — | — | — |
| 2 | Steel Sheet A | 10.6 | 0.25 | 0 | 0.0015 | 0.0005 | G | G | 14 | 12 | 1.17 | 4 | PO$_4^{3-}$ |
| 3 | Steel Sheet A | 10.6 | 0.25 | 0 | 0.0015 | 0.0005 | G | G | 25 | 16 | 1.56 | 7 | PO$_4^{3-}$ |
| 4 | Steel Sheet A | 10.6 | 0.25 | 0 | 0.0015 | 0.0005 | G | G | 0.5 | 1 | 0.50 | 0.3 | PO$_4^{3-}$ |
| 5 | Steel Sheet A | 10.6 | 0.25 | 0 | 0.0015 | 0.0005 | G | G | 1 | 1 | 1.00 | 0.3 | PO$_4^{3-}$ |
| 6 | Steel Sheet A | 10.6 | 0.25 | 0 | 0.0015 | 0.0005 | G | G | 5 | 3 | 1.67 | 1.5 | PO$_4^{3-}$ |
| 7 | Steel Sheet A | 10.6 | 0.25 | 0 | 0.0015 | 0.0005 | G | G | 90 | 50 | 1.80 | 26 | PO$_4^{3-}$ |
| 8 | Steel Sheet A | 10.6 | 0.25 | 0 | 0.0015 | 0.0005 | G | G | 1 | 0.05 | 20 | 0.2 | PO$_4^{3-}$ |
| 9 | Steel Sheet A | 10.6 | 0.25 | 0 | 0.0015 | 0.0005 | G | G | 2 | 0.1 | 20 | 0.4 | PO$_4^{3-}$ |

TABLE 2-continued

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | Iη/ISi (—) | Iζ/ISi (—) | IΓ/ISi (—) | | | P Content (mg/m²) | Mn Content (mg/m²) | P/Mn (—) | Thickness (nm) | Kind of P Compound |
| 10 | Steel Sheet A | 10.6 | 0.25 | 0 | 0.0015 | 0.0005 | G | G | 5 | 1 | 5 | 1.5 | PO₄³⁻ |
| 11 | Steel Sheet A | 10.6 | 0.25 | 0 | 0.0015 | 0.0005 | G | G | 32 | 22 | 1.45 | 9 | PO₄³⁻ |
| 12 | Steel Sheet A | 10.6 | 0.25 | 0 | 0.0015 | 0.0005 | G | G | 21 | 27 | 0.78 | 6 | PO₄³⁻ |
| 13 | Steel Sheet A | 10.6 | 0.25 | 0 | 0.0015 | 0.0005 | G | G | 10 | 7 | 1.43 | 3 | PO₄³⁻ |
| 14 | Steel Sheet A | 10.6 | 0.25 | 0 | 0.0015 | 0.0005 | G | G | 28 | 13 | 2.15 | 8 | PO₄³⁻ |
| 15 | Steel Sheet A | 10.6 | 0.25 | 0 | 0.0015 | 0.0005 | G | G | 17 | 15 | 1.13 | 5 | PO₄³⁻ |
| 16 | Steel Sheet B | 9.6 | 0.24 | 0 | 0.0025 | 0.0004 | G | G | — | — | — | — | — |
| 17 | Steel Sheet B | 9.6 | 0.24 | 0 | 0.0025 | 0.0004 | G | G | 14 | 10 | 1.40 | 4 | PO₄³⁻ |
| 18 | Steel Sheet B | 9.6 | 0.24 | 0 | 0.0025 | 0.0004 | G | G | 24 | 16 | 1.50 | 7 | PO₄³⁻ |
| 19 | Steel Sheet B | 9.6 | 0.24 | 0 | 0.0025 | 0.0004 | G | G | 0.4 | 0.9 | 0.44 | 0.3 | PO₄³⁻ |
| 20 | Steel Sheet B | 9.6 | 0.24 | 0 | 0.0025 | 0.0004 | G | G | 1.2 | 1 | 1.20 | 0.3 | PO₄³⁻ |

TABLE 3

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 1 | 307 | 49 | 1.89 | 1 | 36 | 2.23 | Comparative Example |
| 2 | 307 | 49 | 1.89 | 1 | 37 | 2.4 | Example |
| 3 | 307 | 49 | 1.89 | 1 | 37 | 2.37 | Example |
| 4 | 307 | 49 | 1.89 | 1 | 35 | 2.27 | Comparative Example |
| 5 | 307 | 49 | 1.89 | 1 | 36 | 2.31 | Example |
| 6 | 307 | 49 | 1.89 | 1 | 36 | 2.35 | Example |
| 7 | 307 | 49 | 1.89 | 1 | 37 | 2.41 | Example |
| 8 | 307 | 49 | 1.89 | 1 | 36 | 2.29 | Comparative Example |
| 9 | 307 | 49 | 1.89 | 1 | 35 | 2.32 | Example |
| 10 | 307 | 49 | 1.89 | 1 | 36 | 2.34 | Example |
| 11 | 307 | 49 | 1.89 | 0.2 | 8 | 2.28 | Comparative Example |
| 12 | 307 | 49 | 1.89 | 0.3 | 10 | 2.31 | Example |
| 13 | 307 | 49 | 1.89 | 0.6 | 20 | 2.36 | Example |
| 14 | 307 | 48 | 1.89 | 1.5 | 50 | 2.38 | Example |
| 15 | 307 | 47 | 1.89 | 2 | 70 | 2.39 | Example |
| 16 | 299 | 50 | 1.94 | 1 | 36 | 2.25 | Comparative Example |
| 17 | 299 | 50 | 1.94 | 1 | 36 | 2.41 | Example |
| 18 | 299 | 50 | 1.94 | 1 | 36 | 2.39 | Example |
| 19 | 299 | 50 | 1.94 | 1 | 36 | 2.29 | Comparative Example |
| 20 | 299 | 50 | 1.94 | 1 | 36 | 2.33 | Example |

TABLE 4

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | Iη/ISi (—) | Iζ/ISi (—) | IΓ/ISi (—) | | | P Content (mg/m²) | Mn Content (mg/m²) | P/Mn (—) | Thickness (nm) | Kind of P Compound |
| 21 | Steel Sheet B | 9.6 | 0.24 | 0 | 0.0025 | 0.0004 | G | G | 5.2 | 3.1 | 1.68 | 1.5 | PO₄³⁻ |
| 22 | Steel Sheet B | 9.6 | 0.24 | 0 | 0.0025 | 0.0004 | G | G | 93 | 48 | 1.94 | 26 | PO₄³⁻ |
| 23 | Steel Sheet B | 9.6 | 0.24 | 0 | 0.0025 | 0.0004 | G | G | 1.1 | 0.08 | 13.75 | 0.2 | PO₄³⁻ |
| 24 | Steel Sheet B | 9.6 | 0.24 | 0 | 0.0025 | 0.0004 | G | G | 2.1 | 0.1 | 21 | 0.4 | PO₄³⁻ |
| 25 | Steel Sheet B | 9.6 | 0.24 | 0 | 0.0025 | 0.0004 | G | G | 5.5 | 1.1 | 5 | 1.5 | PO₄³⁻ |
| 26 | Steel Sheet B | 9.6 | 0.24 | 0 | 0.0025 | 0.0004 | G | G | 31 | 23 | 1.35 | 9 | PO₄³⁻ |
| 27 | Steel Sheet B | 9.6 | 0.24 | 0 | 0.0025 | 0.0004 | G | G | 15 | 15 | 1 | 6 | PO₄³⁻ |
| 28 | Steel Sheet B | 9.6 | 0.24 | 0 | 0.0025 | 0.0004 | G | G | 10 | 8 | 1.25 | 3 | PO₄³⁻ |
| 29 | Steel Sheet B | 9.6 | 0.24 | 0 | 0.0025 | 0.0004 | G | G | 26 | 6 | 4.33 | 8 | PO₄³⁻ |
| 30 | Steel Sheet B | 9.6 | 0.24 | 0 | 0.0025 | 0.0004 | G | G | 18 | 9 | 2 | 5 | PO₄³⁻ |

TABLE 4-continued

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | Iη/ISi (—) | Iζ/ISi (—) | IΓ/ISi (—) | | | P Content (mg/m²) | Mn Content (mg/m²) | P/Mn (—) | Thickness (nm) | Kind of P Compound |
| 31 | Steel Sheet C | 11.8 | 0.25 | 0 | 0.0005 | 0.002 | G | G | — | — | — | — | — |
| 32 | Steel Sheet C | 11.8 | 0.25 | 0 | 0.0005 | 0.002 | G | G | 13 | 10 | 1.30 | 4 | PO$_4^{3-}$ |
| 33 | Steel Sheet C | 11.8 | 0.25 | 0 | 0.0005 | 0.002 | G | G | 27 | 15 | 1.80 | 7 | PO$_4^{3-}$ |
| 34 | Steel Sheet C | 11.8 | 0.25 | 0 | 0.0005 | 0.002 | G | G | 0.5 | 0.8 | 0.63 | 0.3 | PO$_4^{3-}$ |
| 35 | Steel Sheet C | 11.8 | 0.25 | 0 | 0.0005 | 0.002 | G | G | 1.3 | 0.9 | 1.44 | 0.3 | PO$_4^{3-}$ |
| 36 | Steel Sheet C | 11.8 | 0.25 | 0 | 0.0005 | 0.002 | G | G | 5.3 | 2.9 | 1.83 | 1.5 | PO$_4^{3-}$ |
| 37 | Steel Sheet C | 11.8 | 0.25 | 0 | 0.0005 | 0.002 | G | G | 89 | 53 | 1.68 | 26 | PO$_4^{3-}$ |
| 38 | Steel Sheet C | 11.8 | 0.25 | 0 | 0.0005 | 0.002 | G | G | 1.1 | 0.04 | 27.5 | 0.2 | PO$_4^{3-}$ |
| 39 | Steel Sheet C | 11.8 | 0.25 | 0 | 0.0005 | 0.002 | G | G | 1.9 | 0.1 | 19 | 0.4 | PO$_4^{3-}$ |
| 40 | Steel Sheet C | 11.8 | 0.25 | 0 | 0.0005 | 0.002 | G | G | 4.8 | 0.9 | 5.33 | 1.5 | PO$_4^{3-}$ |

TABLE 5

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 21 | 299 | 50 | 1.94 | 1 | 36 | 2.37 | Example |
| 22 | 299 | 50 | 1.94 | 1 | 36 | 2.43 | Example |
| 23 | 299 | 50 | 1.94 | 1 | 36 | 2.31 | Comparative Example |
| 24 | 299 | 50 | 1.94 | 1 | 36 | 2.34 | Example |
| 25 | 299 | 50 | 1.94 | 1 | 36 | 2.36 | Example |
| 26 | 299 | 50 | 1.94 | 0.2 | 9 | 2.28 | Comparative Example |
| 27 | 299 | 50 | 1.94 | 0.3 | 11 | 2.33 | Example |
| 28 | 299 | 50 | 1.94 | 0.6 | 19 | 2.38 | Example |
| 29 | 299 | 50 | 1.94 | 1.5 | 49 | 2.4 | Example |
| 30 | 299 | 50 | 1.94 | 2 | 68 | 2.41 | Example |
| 31 | 282 | 52 | 2.05 | 1 | 36 | 2.29 | Comparative Example |
| 32 | 282 | 52 | 2.05 | 1 | 36 | 2.44 | Example |
| 33 | 282 | 52 | 2.05 | 1 | 36 | 2.42 | Example |
| 34 | 282 | 52 | 2.05 | 1 | 38 | 2.31 | Comparative Example |
| 35 | 282 | 52 | 2.05 | 1 | 38 | 2.36 | Example |
| 36 | 282 | 52 | 2.05 | 1 | 35 | 2.4 | Example |
| 37 | 282 | 52 | 2.05 | 1 | 36 | 2.47 | Example |
| 38 | 282 | 52 | 2.05 | 1 | 36 | 2.34 | Comparative Example |
| 39 | 282 | 52 | 2.05 | 1 | 37 | 2.37 | Example |
| 40 | 282 | 52 | 2.05 | 1 | 36 | 2.39 | Example |

TABLE 6

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | Iη/ISi (—) | Iζ/ISi (—) | IΓ/ISi (—) | | | P Content (mg/m²) | Mn Content (mg/m²) | P/Mn (—) | Thickness (nm) | Kind of P Compound |
| 41 | Steel Sheet C | 11.8 | 0.25 | 0 | 0.0005 | 0.002 | G | G | 31 | 21 | 1.48 | 9 | PO$_4^{3-}$ |
| 42 | Steel Sheet C | 11.8 | 0.25 | 0 | 0.0005 | 0.002 | G | G | 17 | 13 | 1.31 | 6 | PO$_4^{3-}$ |
| 43 | Steel Sheet C | 11.8 | 0.25 | 0 | 0.0005 | 0.002 | G | G | 10 | 8 | 1.25 | 3 | PO$_4^{3-}$ |
| 44 | Steel Sheet C | 11.8 | 0.25 | 0 | 0.0005 | 0.002 | G | G | 27 | 6 | 4.5 | 8 | PO$_4^{3-}$ |
| 45 | Steel Sheet C | 11.8 | 0.25 | 0 | 0.0005 | 0.002 | G | G | 18 | 9 | 2 | 5 | PO$_4^{3-}$ |
| 46 | Steel Sheet D | 9.1 | 0.24 | 0 | 0.0075 | 0.0003 | G | G | — | — | — | — | — |
| 47 | Steel Sheet D | 9.1 | 0.24 | 0 | 0.0075 | 0.0003 | G | G | 13 | 11 | 1.18 | 4 | PO$_4^{3-}$ |
| 48 | Steel Sheet D | 9.1 | 0.24 | 0 | 0.0075 | 0.0003 | G | G | 25 | 18 | 1.39 | 7 | PO$_4^{3-}$ |
| 49 | Steel Sheet D | 9.1 | 0.24 | 0 | 0.0075 | 0.0003 | G | G | 0.3 | 0.9 | 0.33 | 0.3 | PO$_4^{3-}$ |
| 50 | Steel Sheet D | 9.1 | 0.24 | 0 | 0.0075 | 0.0003 | G | G | 1 | 1 | 1.00 | 0.3 | PO$_4^{3-}$ |
| 51 | Steel Sheet D | 9.1 | 0.24 | 0 | 0.0075 | 0.0003 | G | G | 4.8 | 3.1 | 1.55 | 1.5 | PO$_4^{3-}$ |
| 52 | Steel Sheet D | 9.1 | 0.24 | 0 | 0.0075 | 0.0003 | G | G | 85 | 52 | 1.63 | 26 | PO$_4^{3-}$ |

TABLE 6-continued

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | $I\eta/ISi$ (—) | $I\zeta/ISi$ (—) | $I\Gamma/ISi$ (—) | | | P Content (mg/m²) | Mn Content (mg/m²) | P/Mn (—) | Thickness (nm) | Kind of P Compound |
| 53 | Steel Sheet D | 9.1 | 0.24 | 0 | 0.0075 | 0.0003 | G | G | 1.3 | 0.05 | 26 | 0.2 | $PO_4^{3-}$ |
| 54 | Steel Sheet D | 9.1 | 0.24 | 0 | 0.0075 | 0.0003 | G | G | 2.2 | 0.11 | 20 | 0.4 | $PO_4^{3-}$ |
| 55 | Steel Sheet D | 9.1 | 0.24 | 0 | 0.0075 | 0.0003 | G | G | 5.2 | 1.1 | 4.73 | 1.5 | $PO_4^{3-}$ |
| 56 | Steel Sheet D | 9.1 | 0.24 | 0 | 0.0075 | 0.0003 | G | G | 30 | 22 | 1.36 | 9 | $PO_4^{3-}$ |
| 57 | Steel Sheet D | 9.1 | 0.24 | 0 | 0.0075 | 0.0003 | G | G | 16 | 14 | 1.14 | 6 | $PO_4^{3-}$ |
| 58 | Steel Sheet D | 9.1 | 0.24 | 0 | 0.0075 | 0.0003 | G | G | 10 | 9 | 1.11 | 3 | $PO_4^{3-}$ |
| 59 | Steel Sheet D | 9.1 | 0.24 | 0 | 0.0075 | 0.0003 | G | G | 27 | 6 | 4.5 | 8 | $PO_4^{3-}$ |
| 60 | Steel Sheet D | 9.1 | 0.24 | 0 | 0.0075 | 0.0003 | G | G | 16 | 10 | 1.6 | 5 | $PO_4^{3-}$ |

TABLE 7

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 41 | 282 | 52 | 2.05 | 0.2 | 8 | 2.33 | Comparative Example |
| 42 | 282 | 52 | 2.05 | 0.3 | 10 | 2.36 | Example |
| 43 | 282 | 52 | 2.05 | 0.6 | 21 | 2.42 | Example |
| 44 | 282 | 52 | 2.05 | 1.5 | 53 | 2.43 | Example |
| 45 | 282 | 52 | 2.05 | 2 | 70 | 2.44 | Example |
| 46 | 295 | 51 | 1.98 | 1 | 35 | 2.25 | Comparative Example |
| 47 | 295 | 51 | 1.98 | 1 | 35 | 2.42 | Example |
| 48 | 295 | 51 | 1.98 | 1 | 35 | 2.4 | Example |
| 49 | 295 | 51 | 1.98 | 1 | 36 | 2.3 | Comparative Example |
| 50 | 295 | 51 | 1.98 | 1 | 37 | 2.34 | Example |
| 51 | 295 | 51 | 1.98 | 1 | 36 | 2.38 | Example |
| 52 | 295 | 51 | 1.98 | 1 | 37 | 2.42 | Example |
| 53 | 295 | 51 | 1.98 | 1 | 36 | 2.31 | Comparative Example |
| 54 | 295 | 51 | 1.98 | 1 | 36 | 2.34 | Example |
| 55 | 295 | 51 | 1.98 | 1 | 35 | 2.37 | Example |
| 56 | 295 | 51 | 1.98 | 0.2 | 8 | 2.29 | Comparative Example |
| 57 | 295 | 51 | 1.98 | 0.3 | 12 | 2.35 | Example |
| 58 | 295 | 51 | 1.98 | 0.6 | 20 | 2.39 | Example |
| 59 | 295 | 51 | 1.98 | 1.5 | 52 | 2.4 | Example |
| 60 | 295 | 51 | 1.98 | 2 | 69 | 2.41 | Example |

TABLE 8

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | $I\eta/ISi$ (—) | $I\zeta/ISi$ (—) | $I\Gamma/ISi$ (—) | | | P Content (mg/m²) | Mn Content (mg/m²) | P/Mn (—) | Thickness (nm) | Kind of P Compound |
| 61 | Steel Sheet E | 10.3 | 0.24 | 0 | 0.0019 | 0.0005 | G | G | — | — | — | — | — |
| 62 | Steel Sheet E | 10.3 | 0.24 | 0 | 0.0019 | 0.0005 | G | G | 14 | 10 | 1.4 | 4 | $PO_4^{3-}$ |
| 63 | Steel Sheet E | 10.3 | 0.24 | 0 | 0.0019 | 0.0005 | G | G | 26 | 16 | 1.63 | 7 | $PO_4^{3-}$ |
| 64 | Steel Sheet E | 10.3 | 0.24 | 0 | 0.0019 | 0.0005 | G | G | 0.6 | 1 | 0.60 | 0.3 | $PO_4^{3-}$ |
| 65 | Steel Sheet E | 10.3 | 0.24 | 0 | 0.0019 | 0.0005 | G | G | 1.3 | 1 | 1.30 | 0.3 | $PO_4^{3-}$ |
| 66 | Steel Sheet E | 10.3 | 0.24 | 0 | 0.0019 | 0.0005 | G | G | 6 | 3 | 2.00 | 1.5 | $PO_4^{3-}$ |
| 67 | Steel Sheet E | 10.3 | 0.24 | 0 | 0.0019 | 0.0005 | G | G | 91 | 50 | 1.82 | 26 | $PO_4^{3-}$ |
| 68 | Steel Sheet E | 10.3 | 0.24 | 0 | 0.0019 | 0.0005 | G | G | 1 | 0.04 | 25 | 0.2 | $PO_4^{3-}$ |
| 69 | Steel Sheet E | 10.3 | 0.24 | 0 | 0.0019 | 0.0005 | G | G | 2 | 0.2 | 10 | 0.4 | $PO_4^{3-}$ |
| 70 | Steel Sheet E | 10.3 | 0.24 | 0 | 0.0019 | 0.0005 | G | G | 6 | 1 | 6 | 1.5 | $PO_4^{3-}$ |
| 71 | Steel Sheet E | 10.3 | 0.24 | 0 | 0.0019 | 0.0005 | G | G | 31 | 23 | 1.35 | 9 | $PO_4^{3-}$ |
| 72 | Steel Sheet E | 10.3 | 0.24 | 0 | 0.0019 | 0.0005 | G | G | 15 | 15 | 1 | 6 | $PO_4^{3-}$ |
| 73 | Steel Sheet E | 10.3 | 0.24 | 0 | 0.0019 | 0.0005 | G | G | 10 | 8 | 1.25 | 3 | $PO_4^{3-}$ |
| 74 | Steel Sheet E | 10.3 | 0.24 | 0 | 0.0019 | 0.0005 | G | G | 29 | 5 | 5.8 | 8 | $PO_4^{3-}$ |

TABLE 8-continued

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | $I\eta/ISi$ (—) | $I\zeta/ISi$ (—) | $I\Gamma/ISi$ (—) | | | P Content (mg/m$^2$) | Mn Content (mg/m$^2$) | P/Mn (—) | Thickness (nm) | Kind of P Compound |
| 75 | Steel Sheet E | 10.3 | 0.24 | 0 | 0.0019 | 0.0005 | G | G | 17 | 10 | 1.7 | 5 | PO$_4^{3-}$ |
| 76 | Steel Sheet F | 11.2 | 0.25 | 0 | 0.001 | 0.0014 | G | G | — | — | — | — | — |
| 77 | Steel Sheet F | 11.2 | 0.25 | 0 | 0.001 | 0.0014 | G | G | 13 | 11 | 1.18 | 4 | PO$_4^{3-}$ |
| 78 | Steel Sheet F | 11.2 | 0.25 | 0 | 0.001 | 0.0014 | G | G | 23 | 16 | 1.44 | 7 | PO$_4^{3-}$ |
| 79 | Steel Sheet F | 11.2 | 0.25 | 0 | 0.001 | 0.0014 | G | G | 0.7 | 1 | 0.70 | 0.3 | PO$_4^{3-}$ |
| 80 | Steel Sheet F | 11.2 | 0.25 | 0 | 0.001 | 0.0014 | G | G | 1.2 | 1 | 1.20 | 0.3 | PO$_4^{3-}$ |

TABLE 9

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 61 | 274 | 54 | 2.2 | 1 | 37 | 2.33 | Comparative Example |
| 62 | 274 | 54 | 2.2 | 1 | 37 | 2.49 | Example |
| 63 | 274 | 54 | 2.2 | 1 | 37 | 2.47 | Example |
| 64 | 274 | 54 | 2.2 | 1 | 37 | 2.36 | Comparative Example |
| 65 | 274 | 54 | 2.2 | 1 | 36 | 2.41 | Example |
| 66 | 274 | 54 | 2.2 | 1 | 36 | 2.45 | Example |
| 67 | 274 | 54 | 2.2 | 1 | 36 | 2.52 | Example |
| 68 | 274 | 54 | 2.2 | 1 | 35 | 2.39 | Comparative Example |
| 69 | 274 | 54 | 2.2 | 1 | 35 | 2.42 | Example |
| 70 | 274 | 54 | 2.2 | 1 | 36 | 2.44 | Example |
| 71 | 274 | 54 | 2.2 | 0.2 | 7 | 2.37 | Comparative Example |
| 72 | 274 | 54 | 2.2 | 0.3 | 11 | 2.42 | Example |
| 73 | 274 | 54 | 2.2 | 0.6 | 18 | 2.46 | Example |
| 74 | 274 | 54 | 2.2 | 1.5 | 54 | 2.48 | Example |
| 75 | 274 | 54 | 2.2 | 2 | 70 | 2.49 | Example |
| 76 | 315 | 48 | 1.61 | 1 | 36 | 2.16 | Comparative Example |
| 77 | 315 | 48 | 1.61 | 1 | 36 | 2.3 | Example |
| 78 | 315 | 48 | 1.61 | 1 | 36 | 2.28 | Example |
| 79 | 315 | 48 | 1.61 | 1 | 36 | 2.18 | Comparative Example |
| 80 | 315 | 48 | 1.61 | 1 | 35 | 2.23 | Example |

TABLE 10

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | $I\eta/ISi$ (—) | $I\zeta/ISi$ (—) | $I\Gamma/ISi$ (—) | | | P Content (mg/m$^2$) | Mn Content (mg/m$^2$) | P/Mn (—) | Thickness (nm) | Kind of P Compound |
| 81 | Steel Sheet F | 11.2 | 0.25 | 0 | 0.001 | 0.0014 | G | G | 4.8 | 3.1 | 1.55 | 1.5 | PO$_4^{3-}$ |
| 82 | Steel Sheet F | 11.2 | 0.25 | 0 | 0.001 | 0.0014 | G | G | 95 | 53 | 1.79 | 26 | PO$_4^{3-}$ |
| 83 | Steel Sheet F | 11.2 | 0.25 | 0 | 0.001 | 0.0014 | G | G | 1.3 | 0.06 | 22 | 0.2 | PO$_4^{3-}$ |
| 84 | Steel Sheet F | 11.2 | 0.25 | 0 | 0.001 | 0.0014 | G | G | 1.8 | 0.15 | 12 | 0.4 | PO$_4^{3-}$ |
| 85 | Steel Sheet F | 11.2 | 0.25 | 0 | 0.001 | 0.0014 | G | G | 5.3 | 1 | 5.3 | 1.5 | PO$_4^{3-}$ |
| 86 | Steel Sheet F | 11.2 | 0.25 | 0 | 0.001 | 0.0014 | G | G | 33 | 23 | 1.43 | 9 | PO$_4^{3-}$ |
| 87 | Steel Sheet F | 11.2 | 0.25 | 0 | 0.001 | 0.0014 | G | G | 16 | 15 | 1.07 | 6 | PO$_4^{3-}$ |
| 88 | Steel Sheet F | 11.2 | 0.25 | 0 | 0.001 | 0.0014 | G | G | 10 | 8 | 1.25 | 3 | PO$_4^{3-}$ |
| 89 | Steel Sheet F | 11.2 | 0.25 | 0 | 0.001 | 0.0014 | G | G | 25 | 6 | 4.17 | 8 | PO$_4^{3-}$ |
| 90 | Steel Sheet F | 11.2 | 0.25 | 0 | 0.001 | 0.0014 | G | G | 16 | 10 | 1.6 | 5 | PO$_4^{3-}$ |
| 91 | Steel Sheet G | 10.9 | 0.24 | 0 | 0.0013 | 0.001 | G | G | — | — | — | — | — |
| 92 | Steel Sheet G | 10.9 | 0.24 | 0 | 0.0013 | 0.001 | G | G | 14 | 10 | 1.4 | 4 | PO$_4^{3-}$ |
| 93 | Steel Sheet G | 10.9 | 0.24 | 0 | 0.0013 | 0.001 | G | G | 28 | 17 | 1.65 | 7 | PO$_4^{3-}$ |
| 94 | Steel Sheet G | 10.9 | 0.24 | 0 | 0.0013 | 0.001 | G | G | 0.4 | 0.9 | 0.44 | 0.3 | PO$_4^{3-}$ |
| 95 | Steel Sheet G | 10.9 | 0.24 | 0 | 0.0013 | 0.001 | G | G | 1.5 | 1 | 1.50 | 0.3 | PO$_4^{3-}$ |

TABLE 10-continued

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | Kind of P Compound |
|---|---|---|---|---|---|---|---|---|---|---|---|---|---|
| | | | | Iη/ISi (—) | Iζ/ISi (—) | IΓ/ISi (—) | | | P Content (mg/m²) | Mn Content (mg/m²) | P/Mn (—) | Thickness (nm) | |
| 96 | Steel Sheet G | 10.9 | 0.24 | 0 | 0.0013 | 0.001 | G | G | 7 | 4 | 1.75 | 1.5 | PO₄³⁻ |
| 97 | Steel Sheet G | 10.9 | 0.24 | 0 | 0.0013 | 0.001 | G | G | 92 | 49 | 1.88 | 26 | PO₄³⁻ |
| 98 | Steel Sheet G | 10.9 | 0.24 | 0 | 0.0013 | 0.001 | G | G | 1.3 | 0.05 | 26 | 0.2 | PO₄³⁻ |
| 99 | Steel Sheet G | 10.9 | 0.24 | 0 | 0.0013 | 0.001 | G | G | 2.2 | 0.13 | 17 | 0.4 | PO₄³⁻ |
| 100 | Steel Sheet G | 10.9 | 0.24 | 0 | 0.0013 | 0.001 | G | G | 4.9 | 1 | 4.9 | 1.5 | PO₄³⁻ |

TABLE 11

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 81 | 315 | 48 | 1.61 | 1 | 35 | 2.26 | Example |
| 82 | 315 | 48 | 1.61 | 1 | 35 | 2.33 | Example |
| 83 | 315 | 48 | 1.61 | 1 | 36 | 2.2 | Comparative Example |
| 84 | 315 | 48 | 1.61 | 1 | 36 | 2.23 | Example |
| 85 | 315 | 48 | 1.61 | 1 | 35 | 2.25 | Example |
| 86 | 315 | 48 | 1.61 | 0.2 | 8 | 2.19 | Comparative Example |
| 87 | 315 | 48 | 1.61 | 0.3 | 10 | 2.24 | Example |
| 88 | 315 | 48 | 1.61 | 0.6 | 20 | 2.27 | Example |
| 89 | 315 | 48 | 1.61 | 1.5 | 50 | 2.29 | Example |
| 90 | 315 | 48 | 1.61 | 2 | 68 | 2.31 | Example |
| 91 | 341 | 41 | 1.6 | 1 | 36 | 2.15 | Comparative Example |
| 92 | 341 | 41 | 1.6 | 1 | 35 | 2.3 | Example |
| 93 | 341 | 41 | 1.6 | 1 | 35 | 2.28 | Example |
| 94 | 341 | 41 | 1.6 | 1 | 35 | 2.18 | Comparative Example |
| 95 | 341 | 41 | 1.6 | 1 | 36 | 2.22 | Example |
| 96 | 341 | 41 | 1.6 | 1 | 36 | 2.26 | Example |
| 97 | 341 | 41 | 1.6 | 1 | 37 | 2.34 | Example |
| 98 | 341 | 41 | 1.6 | 1 | 37 | 2.2 | Comparative Example |
| 99 | 341 | 41 | 1.6 | 1 | 36 | 2.23 | Example |
| 100 | 341 | 41 | 1.6 | 1 | 36 | 2.27 | Example |

TABLE 12

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | Kind of P Compound |
|---|---|---|---|---|---|---|---|---|---|---|---|---|---|
| | | | | Iη/ISi (—) | Iζ/ISi (—) | IΓ/ISi (—) | | | P Content (mg/m²) | Mn Content (mg/m²) | P/Mn (—) | Thickness (nm) | |
| 101 | Steel Sheet G | 10.9 | 0.24 | 0 | 0.0013 | 0.001 | G | G | 30 | 23 | 1.30 | 9 | PO₄³⁻ |
| 102 | Steel Sheet G | 10.9 | 0.24 | 0 | 0.0013 | 0.001 | G | G | 16 | 13 | 1.23 | 6 | PO₄³⁻ |
| 103 | Steel Sheet G | 10.9 | 0.24 | 0 | 0.0013 | 0.001 | G | G | 9 | 9 | 1 | 3 | PO₄³⁻ |
| 104 | Steel Sheet G | 10.9 | 0.24 | 0 | 0.0013 | 0.001 | G | G | 27 | 6 | 4.5 | 8 | PO₄³⁻ |
| 105 | Steel Sheet G | 10.9 | 0.24 | 0 | 0.0013 | 0.001 | G | G | 19 | 9 | 2.11 | 5 | PO₄³⁻ |
| 106 | Steel Sheet H | 9.4 | 0.25 | 0 | 0.0038 | 0.0004 | G | G | — | — | — | — | — |
| 107 | Steel Sheet H | 9.4 | 0.25 | 0 | 0.0038 | 0.0004 | G | G | 14 | 10 | 1.4 | 4 | PO₄³⁻ |
| 108 | Steel Sheet H | 9.4 | 0.25 | 0 | 0.0038 | 0.0004 | G | G | 28 | 17 | 1.65 | 7 | PO₄³⁻ |
| 109 | Steel Sheet H | 9.4 | 0.25 | 0 | 0.0038 | 0.0004 | G | G | 0.4 | 0.9 | 0.44 | 0.3 | PO₄³⁻ |
| 110 | Steel Sheet H | 9.4 | 0.25 | 0 | 0.0038 | 0.0004 | G | G | 1.1 | 1.2 | 0.92 | 0.3 | PO₄³⁻ |
| 111 | Steel Sheet H | 9.4 | 0.25 | 0 | 0.0038 | 0.0004 | G | G | 5.3 | 3 | 1.77 | 1.5 | PO₄³⁻ |
| 112 | Steel Sheet H | 9.4 | 0.25 | 0 | 0.0038 | 0.0004 | G | G | 91 | 52 | 1.75 | 26 | PO₄³⁻ |
| 113 | Steel Sheet H | 9.4 | 0.25 | 0 | 0.0038 | 0.0004 | G | G | 0.8 | 0.07 | 11 | 0.2 | PO₄³⁻ |
| 114 | Steel Sheet H | 9.4 | 0.25 | 0 | 0.0038 | 0.0004 | G | G | 1.9 | 0.1 | 19 | 0.4 | PO₄³⁻ |
| 115 | Steel Sheet H | 9.4 | 0.25 | 0 | 0.0038 | 0.0004 | G | G | 4.8 | 1 | 4.8 | 1.5 | PO₄³⁻ |
| 116 | Steel Sheet H | 9.4 | 0.25 | 0 | 0.0038 | 0.0004 | G | G | 33 | 22 | 1.50 | 9 | PO₄³⁻ |
| 117 | Steel Sheet H | 9.4 | 0.25 | 0 | 0.0038 | 0.0004 | G | G | 15 | 15 | 1 | 6 | PO₄³⁻ |

TABLE 12-continued

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | Kind of P Compound |
|---|---|---|---|---|---|---|---|---|---|---|---|---|---|
| | | | | $I\eta/ISi$ (—) | $I\zeta/ISi$ (—) | $I\Gamma/ISi$ (—) | | | P Content (mg/m$^2$) | Mn Content (mg/m$^2$) | P/Mn (—) | Thickness (nm) | |
| 118 | Steel Sheet H | 9.4 | 0.25 | 0 | 0.0038 | 0.0004 | G | G | 10 | 8 | 1.25 | 3 | PO$_4^{3-}$ |
| 119 | Steel Sheet H | 9.4 | 0.25 | 0 | 0.0038 | 0.0004 | G | G | 27 | 6 | 4.5 | 8 | PO$_4^{3-}$ |
| 120 | Steel Sheet H | 9.4 | 0.25 | 0 | 0.0038 | 0.0004 | G | G | 17 | 10 | 1.7 | 5 | PO$_4^{3-}$ |

TABLE 13

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 101 | 341 | 41 | 1.6 | 0.2 | 7 | 2.19 | Comparative Example |
| 102 | 341 | 41 | 1.6 | 0.3 | 13 | 2.23 | Example |
| 103 | 341 | 41 | 1.6 | 0.6 | 23 | 2.27 | Example |
| 104 | 341 | 41 | 1.6 | 1.5 | 47 | 2.29 | Example |
| 105 | 341 | 41 | 1.6 | 2 | 67 | 2.3 | Example |
| 106 | 341 | 41 | 1.6 | 1 | 36 | 2.14 | Comparative Example |
| 107 | 341 | 41 | 1.6 | 1 | 36 | 2.29 | Example |
| 108 | 341 | 41 | 1.6 | 1 | 35 | 2.27 | Example |
| 109 | 341 | 41 | 1.6 | 1 | 35 | 2.17 | Comparative Example |
| 110 | 341 | 41 | 1.6 | 1 | 35 | 2.23 | Example |
| 111 | 341 | 41 | 1.6 | 1 | 36 | 2.26 | Example |
| 112 | 341 | 41 | 1.6 | 1 | 36 | 2.33 | Example |
| 113 | 341 | 41 | 1.6 | 1 | 36 | 2.21 | Comparative Example |
| 114 | 341 | 41 | 1.6 | 1 | 36 | 2.24 | Example |
| 115 | 341 | 41 | 1.6 | 1 | 37 | 2.25 | Example |
| 116 | 341 | 41 | 1.6 | 0.2 | 8 | 2.19 | Comparative Example |
| 117 | 341 | 41 | 1.6 | 0.3 | 14 | 2.23 | Example |
| 118 | 341 | 41 | 1.6 | 0.6 | 21 | 2.27 | Example |
| 119 | 341 | 41 | 1.6 | 1.5 | 49 | 2.3 | Example |
| 120 | 341 | 41 | 1.6 | 2 | 68 | 2.32 | Example |

TABLE 14

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | Kind of P Compound |
|---|---|---|---|---|---|---|---|---|---|---|---|---|---|
| | | | | $I\eta/ISi$ (—) | $I\zeta/ISi$ (—) | $I\Gamma/ISi$ (—) | | | P Content (mg/m$^2$) | Mn Content (mg/m$^2$) | P/Mn (—) | Thickness (nm) | |
| 121 | Steel Sheet I | 11.5 | 0.24 | 0 | 0.0008 | 0.0016 | G | G | — | — | — | — | — |
| 122 | Steel Sheet I | 11.5 | 0.24 | 0 | 0.0008 | 0.0016 | G | G | 15 | 9 | 1.67 | 4 | PO$_4^{3-}$ |
| 123 | Steel Sheet I | 11.5 | 0.24 | 0 | 0.0008 | 0.0016 | G | G | 22 | 16 | 1.38 | 7 | PO$_4^{3-}$ |
| 124 | Steel Sheet I | 11.5 | 0.24 | 0 | 0.0008 | 0.0016 | G | G | 0.5 | 1.1 | 0.45 | 0.3 | PO$_4^{3-}$ |
| 125 | Steel Sheet I | 11.5 | 0.24 | 0 | 0.0008 | 0.0016 | G | G | 1 | 0.8 | 1.25 | 0.3 | PO$_4^{3-}$ |
| 126 | Steel Sheet I | 11.5 | 0.24 | 0 | 0.0008 | 0.0016 | G | G | 5.2 | 2.9 | 1.79 | 1.5 | PO$_4^{3-}$ |
| 127 | Steel Sheet I | 11.5 | 0.24 | 0 | 0.0008 | 0.0016 | G | G | 94 | 49 | 1.92 | 26 | PO$_4^{3-}$ |
| 128 | Steel Sheet I | 11.5 | 0.24 | 0 | 0.0008 | 0.0016 | G | G | 1 | 0.05 | 20 | 0.2 | PO$_4^{3-}$ |
| 129 | Steel Sheet I | 11.5 | 0.24 | 0 | 0.0008 | 0.0016 | G | G | 2.2 | 0.1 | 22 | 0.4 | PO$_4^{3-}$ |
| 130 | Steel Sheet I | 11.5 | 0.24 | 0 | 0.0008 | 0.0016 | G | G | 5 | 1.3 | 3.8 | 1.5 | PO$_4^{3-}$ |
| 131 | Steel Sheet I | 11.5 | 0.24 | 0 | 0.0008 | 0.0016 | G | G | 33 | 22 | 1.50 | 9 | PO$_4^{3-}$ |
| 132 | Steel Sheet I | 11.5 | 0.24 | 0 | 0.0008 | 0.0016 | G | G | 16 | 14 | 1.14 | 6 | PO$_4^{3-}$ |
| 133 | Steel Sheet I | 11.5 | 0.24 | 0 | 0.0008 | 0.0016 | G | G | 10 | 8 | 1.25 | 3 | PO$_4^{3-}$ |
| 134 | Steel Sheet I | 11.5 | 0.24 | 0 | 0.0008 | 0.0016 | G | G | 27 | 6 | 4.5 | 8 | PO$_4^{3-}$ |
| 135 | Steel Sheet I | 11.5 | 0.24 | 0 | 0.0008 | 0.0016 | G | G | 19 | 9 | 2.11 | 5 | PO$_4^{3-}$ |

TABLE 15

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 121 | 330 | 45 | 1.45 | 1 | 36 | 2.08 | Comparative Example |
| 122 | 330 | 45 | 1.45 | 1 | 36 | 2.25 | Example |
| 123 | 330 | 45 | 1.45 | 1 | 35 | 2.23 | Example |
| 124 | 330 | 45 | 1.45 | 1 | 37 | 2.13 | Comparative Example |
| 125 | 330 | 45 | 1.45 | 1 | 35 | 2.18 | Example |
| 126 | 330 | 45 | 1.45 | 1 | 36 | 2.21 | Example |
| 127 | 330 | 45 | 1.45 | 1 | 37 | 2.28 | Example |
| 128 | 330 | 45 | 1.45 | 1 | 36 | 2.16 | Comparative Example |
| 129 | 330 | 45 | 1.45 | 1 | 36 | 2.19 | Example |
| 130 | 330 | 45 | 1.45 | 1 | 36 | 2.22 | Example |
| 131 | 330 | 45 | 1.45 | 0.2 | 8 | 2.15 | Comparative Example |
| 132 | 330 | 45 | 1.45 | 0.3 | 12 | 2.19 | Example |
| 133 | 330 | 45 | 1.45 | 0.6 | 20 | 2.22 | Example |
| 134 | 330 | 45 | 1.45 | 1.5 | 51 | 2.23 | Example |
| 135 | 330 | 45 | 1.45 | 2 | 70 | 2.25 | Example |

Example 2

A slab having a composition of Symbol C of Table 1 was heated to 1150° C. and subjected to hot rolling at a finishing temperature of 910 to 930° C. to produce a hot-rolled steel strip of 4 mm, and the hot-rolled steel strip was wound up at 680 to 720° C. After performing acid washing, cold rolling was performed on the hot-rolled steel strip to produce a cold-rolled steel strip of 0.8 mm. Moreover, using continuous hot dip galvanizing equipment in an in-line annealing system, annealing, galvanizing, and alloying were performed on the cold-rolled steel strip, thereby producing a galvannealed steel sheet. In the galvannealing process, the annealing atmosphere was a mixed gas of 5 vol % of hydrogen and 95 vol % of nitrogen, the annealing temperature was 800 to 840° C., and the annealing time was 90 seconds. As the hot dip galvanizing bath, a hot dip galvanizing bath having an effective Al concentration of 0.105% was used, and the amount of zinc was controlled to 50 g/m² using a gas wiper. During heating in alloying, heating equipment in an induction heating system was used to perform the alloying at 440 to 550° C. In skin pass rolling, the bright roll having a work roll diameter of 480 mm was used. Moreover, skin pass rolling was performed on each galvannealed steel sheet to achieve elongation ratios shown in Table 17.

Furthermore, treatment liquids in which the concentration of potassium permanganate and the concentration of at least one of phosphoric acid, phosphorous acid, and hypophosphorous acid were different were applied to the galvannealed steel sheets to allow the galvannealed layer on the galvannealed surface to react with the treatment liquids, thereby producing composite oxide layers of Mn, Zn, and P. The coated amount of the treatment liquid was controlled by changing the amount of the treatment liquid applied.

The Fe concentration Fe % and the Al concentration Al % in the galvannealed layer, the P content and the Mn content in the composite oxide layer of Mn, Zn, and P, and the thickness of the composite oxide layer of Mn, Zn, and P were measured using the same methods as in Example 1.

With regard to the kinds of the P compounds in the composite oxide layer of Mn, Zn, and P, existence of $PO_4^{3-}$ was confirmed using a phosphorus molybdenum blue method. When $PO_4^{3-}$ was not confirmed by the phosphorus molybdenum blue method, existence of an oxo-acid of phosphorus was confirmed using TOF-SIMS (Time-Of-Flight Secondary Ion Mass Spectrometry). With regard to the kinds of the P compounds, when $PO_4^{3-}$ was confirmed using the phosphorus molybdenum blue method, the P compounds were determined as $PO_4^{3-}$. In addition, when instead of $PO_4^{3-}$, an oxo-acid of phosphorus was confirmed, the P compounds were determined as $PO_3^{2-}$ and $PO_2^{-}$.

The X-ray diffraction intensity ratios (Iη/ISi, Iζ/ISi, and IΓ/ISi) of phases were measured by the same methods as in Example 1.

In addition, as indexes of formability, strength, elongation, and Lankford value (as the r-value, the average of the r-value of 0°, the r-value of 45°, and the r-value of 90° was used) were measured using the same methods as in Example 1.

The area ratio of the flat portion on the galvannealed surface, the surface roughness Ra of the flat portion, and the surface roughness Ra of the rough portion were measured using the same methods as in Example 1. The evaluation method of the surface roughness was the same as in Example 1.

In the same manner, deep drawability was evaluated under the same conditions as in Example 1.

The results are shown in Tables 16 and 17. In Comparative Example No. 201, a film of a composite oxide layer was not formed on the surface of the galvannealed layer, so that Formula (1) was not satisfied. In Comparative Example No. 204, the P content in the composite oxide layer was less than 1 mg/m² or more than 100 mg/m², so that Formula (1) was not satisfied. In Comparative Example No. 208, the Mn content in the composite oxide layer was less than 0.1 mg/m² or more than 100 mg/m², so that Formula (1) was not satisfied. In Comparative Example No. 211, the area ratio of the flat portion was lower than 10% or higher than 70%, so that Formula (1) was not satisfied.

In examples excluding the above-mentioned numbers (comparative examples), galvannealed steel sheets having galvannealed layers which have sufficient area ratios of flat portions and composite oxide layers which have sufficient Mn contents and P contents were used. Accordingly, the galvannealed steel sheets according to the examples satisfied Formula (1) and were excellent in deep drawability.

TABLE 16

| No. | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion |
|---|---|---|---|---|---|---|---|
| | | | Iη/ISi (—) | Iζ/ISi (—) | IΓ/ISi (—) | | |
| 201 | 10.6 | 0.25 | 0 | 0.0015 | 0.0005 | G | G |
| 202 | 10.6 | 0.25 | 0 | 0.0015 | 0.0005 | G | G |
| 203 | 10.6 | 0.25 | 0 | 0.0015 | 0.0005 | G | G |
| 204 | 10.6 | 0.25 | 0 | 0.0015 | 0.0005 | G | G |
| 205 | 10.6 | 0.25 | 0 | 0.0015 | 0.0005 | G | G |
| 206 | 10.6 | 0.25 | 0 | 0.0015 | 0.0005 | G | G |
| 207 | 10.6 | 0.25 | 0 | 0.0015 | 0.0005 | G | G |
| 208 | 10.6 | 0.25 | 0 | 0.0015 | 0.0005 | G | G |
| 209 | 10.6 | 0.25 | 0 | 0.0015 | 0.0005 | G | G |
| 210 | 10.6 | 0.25 | 0 | 0.0015 | 0.0005 | G | G |
| 211 | 10.6 | 0.25 | 0 | 0.0015 | 0.0005 | G | G |
| 212 | 10.6 | 0.25 | 0 | 0.0015 | 0.0005 | G | G |
| 213 | 10.6 | 0.25 | 0 | 0.0015 | 0.0005 | G | G |
| 214 | 10.6 | 0.25 | 0 | 0.0015 | 0.0005 | G | G |
| 215 | 10.6 | 0.25 | 0 | 0.0015 | 0.0005 | G | G |

| No. | Concentration of Treatment Liquid | | | Composite Oxide of Mn, Zn, P | | | | |
|---|---|---|---|---|---|---|---|---|
| | $KMnO_4$ (g/l) | $H_3PO_4$ (g/l) | $H_2PO_3$ (g/l) | P Content (mg/m$^2$) | Mn Content (mg/m$^2$) | P/Mn (—) | Thickness (nm) | Kind of P Compound |
| 201 | — | — | — | — | — | — | — | — |
| 202 | 14 | 6 | — | 14 | 10 | 1.4 | 4 | $PO_4^{3-}$ |
| 203 | 12 | — | 6 | 25 | 17 | 1.47 | 7 | $PO_3^{2-}, PO_2^-$ |
| 204 | 6 | — | 10 | 0.6 | 1 | 0.60 | 0.3 | $PO_3^{2-}, PO_2^-$ |
| 205 | 10 | — | 10 | 1.1 | 1 | 1.10 | 0.3 | $PO_3^{2-}, PO_2^-$ |
| 206 | 12 | — | 6 | 5 | 3.2 | 1.56 | 1.5 | $PO_3^{2-}, PO_2^-$ |
| 207 | 30 | — | 15 | 85 | 50 | 1.70 | 26 | $PO_3^{2-}, PO_2^-$ |
| 208 | 12 | — | 6 | 1 | 0.05 | 20 | 0.2 | $PO_3^{2-}, PO_2^-$ |
| 209 | 12 | — | 6 | 1.9 | 0.1 | 19 | 0.4 | $PO_3^{2-}, PO_2^-$ |
| 210 | 12 | — | 3 | 5 | 1 | 5 | 1.5 | $PO_3^{2-}, PO_2^-$ |
| 211 | 15 | — | 10 | 32 | 23 | 1.39 | 9 | $PO_3^{2-}, PO_2^-$ |
| 212 | 15 | — | 10 | 16 | 15 | 1.07 | 6 | $PO_3^{2-}, PO_2^-$ |
| 213 | 15 | — | 10 | 10 | 8 | 1.25 | 3 | $PO_3^{2-}, PO_2^-$ |
| 214 | 15 | — | 10 | 27 | 6 | 4.5 | 8 | $PO_3^{2-}, PO_2^-$ |
| 215 | 15 | — | 10 | 17 | 9 | 1.89 | 5 | $PO_3^{2-}, PO_2^-$ |

TABLE 17

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 201 | 282 | 52 | 2.05 | 1 | 37 | 2.29 | Comparative Example |
| 202 | 282 | 52 | 2.05 | 1 | 36 | 2.44 | Example |
| 203 | 282 | 52 | 2.05 | 1 | 37 | 2.4 | Example |
| 204 | 282 | 52 | 2.05 | 1 | 37 | 2.3 | Comparative Example |
| 205 | 282 | 52 | 2.05 | 1 | 36 | 2.36 | Example |
| 206 | 282 | 52 | 2.05 | 1 | 36 | 2.39 | Example |
| 207 | 282 | 52 | 2.05 | 1 | 35 | 2.45 | Example |
| 208 | 282 | 52 | 2.05 | 1 | 35 | 2.33 | Comparative Example |
| 209 | 282 | 52 | 2.05 | 1 | 36 | 2.36 | Example |
| 210 | 282 | 52 | 2.05 | 1 | 36 | 2.39 | Example |
| 211 | 282 | 52 | 2.05 | 0.2 | 8 | 2.32 | Comparative Example |
| 212 | 282 | 52 | 2.05 | 0.3 | 10 | 2.36 | Example |
| 213 | 282 | 52 | 2.05 | 0.6 | 20 | 2.41 | Example |
| 214 | 282 | 52 | 2.05 | 1.5 | 55 | 2.42 | Example |
| 215 | 282 | 52 | 2.05 | 2 | 70 | 2.43 | Example |

Example 3

A slab having a composition of Symbol D of Table 1 was heated to 1150° C. and subjected to hot rolling at a finishing temperature of 910 to 930° C. to produce a hot-rolled steel strip of 4 mm, and the hot-rolled steel strip was wound up at 680 to 720° C. After performing acid washing, cold rolling was performed on the hot-rolled steel strip to produce a cold-rolled steel strip of 0.8 mm. Moreover, using continuous hot dip galvanizing equipment in an in-line annealing system, annealing, galvanizing, and alloying were performed on the cold-rolled steel strip, thereby producing a galvannealed steel sheet. In the galvannealing process, the annealing atmosphere was a mixed gas of 5 vol % of hydrogen and 95 vol % of nitrogen, the annealing temperature was 800 to 840° C., and the annealing time was 90 seconds. As the hot dip galvanizing bath, a hot dip galvanizing bath having an effective Al concentration of 0.105% was used, and the amount of zinc was controlled to 50 g/m² using a gas wiper. During heating in alloying, heating equipment in an induction heating system was used to perform the alloying at 440 to 600° C. In skin pass rolling, a bright roll having a work roll diameter of 480 mm or a dull roll having unevenness on the surface was used. Moreover, skin pass rolling was performed on each galvannealed steel sheet to achieve elongation ratios of 0.8 to 1.2%.

Furthermore, treatment liquids in which the concentration of potassium permanganate and the concentration of phosphoric acid were different were applied to the galvannealed steel sheets to allow the galvannealed layer on the galvannealed surface to react with the treatment liquids, thereby producing composite oxide layers of Mn, Zn, and P. The coated amount of the treatment liquid was controlled by changing the amount of the treatment liquid applied.

The Fe concentration Fe % and the Al concentration Al % in the galvannealed layer, the P content and the Mn content in the composite oxide layer of Mn, Zn, and P, and the thickness of the composite oxide layer of Mn, Zn, and P were measured using the same methods as in Example 1.

With regard to the kinds of the P compounds in the composite oxide layer of Mn, Zn, and P, existence of $PO_4^{3-}$ was confirmed using a phosphorus molybdenum blue method.

The X-ray diffraction intensity ratios ($I\eta/ISi$, $I\zeta/ISi$, and $I\Gamma/ISi$) of phases were measured by the same methods as in Example 1.

In addition, as indexes of formability, strength, elongation, and Lankford value (as the r-value, the average of the r-value of 0°, the r-value of 45°, and the r-value of 90° was used) were measured using the same methods as in Example 1.

The area ratio of the flat portion on the galvannealed surface, the surface roughness Ra of the flat portion, and the surface roughness Ra of the rough portion were measured using the same methods as in Example 1. The evaluation method of the surface roughness was the same as in Example 1.

Deep drawability was evaluated by measuring the limiting drawing ratio (LDR) R using the same TZP test as in Example 1.

With regard to adhesion, a sheet drawing test and a bead drawing test were performed to evaluate flaking resistance and powdering resistance.

Test conditions are shown as follows.

The sheet drawing test was performed under the following conditions:
Sample drawing width: 30 mm
Die: flat sheet
Pressing load: 8830 N
Drawing speed: 200 mm/min
Oil application: rust-resistant oil application The bead drawing test was performed under the following conditions:
Sample drawing width: 30 mm
Die: a convex-shaped die of an angular bead (protruded portion of 4×4 mm) of a shoulder radius of R1 mm and a concave-shaped die of a shoulder radius of R1 mm
Pressing load: 11800 N
Drawing speed: 200 mm/min
Oil application: rust-resistant oil application With regard to the flaking resistance, evaluation was made as follows. That is, when drawing was made at a friction coefficient of equal to or lower than 0.15 by the sheet drawing test, the flaking resistance was evaluated as excellent. In addition, when the measured value of the drawing load raised serration and thus the friction coefficient could not be measured, the flaking resistance was evaluated as bad. In cases other than the above cases, the flaking resistance was evaluated as good.

In addition, with regard to the powdering resistance, the evaluation was made as follows. That is, an adhesive tape (cellophane tape) was attached to a sample subjected to the bead drawing test, detached, and the exfoliation amount of the galvannealed layer adhered to the adhesive tape was observed with the naked eye. When the galvannealed layer was not exfoliated at all, the powdering resistance was evaluated as excellent. When a significant amount of the galvannealed layer was exfoliated, the powdering resistance was evaluated as bad. In cases other than the above cases, the powdering resistance was evaluated as good.

The results are shown in Tables 18 and 19. In Example No. 306, the surface roughness of the rough portion was less than 0.5 μm. In Comparative Example No. 309, the Fe concentration Fe % in the galvannealed layer was higher than 12%, so that adhesion of the galvannealed layer was bad.

In examples excluding the above-mentioned numbers (Nos. 306 and 309), the galvannealed layer was suitably alloyed. Accordingly, the galvannealed steel sheets in these examples satisfied Formula (1) and thus exhibited excellent deep drawability and plating adhesion. In addition, in the examples, the flaking resistance was excellent compared to Example No. 306.

TABLE 18

| | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|
| No. | | | $I\eta/ISi$ (—) | $I\zeta/ISi$ (—) | $I\Gamma/ISi$ (—) | | | P Content (mg/m²) | Mn Content (mg/m²) | P/Mn (—) | Thickness (nm) | Kind of P Compound |
| 301 | 10.4 | 0.25 | 0 | 0.0015 | 0.0005 | 2.3 | 0.05 | 25 | 16 | 1.56 | 7 | $PO_4^{3-}$ |
| 302 | 10.4 | 0.25 | 0 | 0.0015 | 0.0005 | 2.2 | 0.07 | 27 | 9 | 3 | 7 | $PO_4^{3-}$ |
| 303 | 10.4 | 0.25 | 0 | 0.0015 | 0.0005 | 2.3 | 0.1 | 22 | 10 | 2.2 | 6 | $PO_4^{3-}$ |
| 304 | 10.4 | 0.25 | 0 | 0.0015 | 0.0005 | 2.4 | 0.2 | 25 | 10 | 2.5 | 7 | $PO_4^{3-}$ |

TABLE 18-continued

| No. | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|
| | | | $I\eta/ISi$ (—) | $I\zeta/ISi$ (—) | $I\Gamma/ISi$ (—) | | | P Content (mg/m$^2$) | Mn Content (mg/m$^2$) | P/Mn (—) | Thickness (nm) | Kind of P Compound |
| 305 | 10.4 | 0.25 | 0 | 0.0015 | 0.0005 | 2.2 | 0.3 | 28 | 9 | 3.11 | 7 | $PO_4^{3-}$ |
| 306 | 7.6 | 0.23 | 0.001 | 0.014 | 0 | 0.4 | 0.07 | 26 | 9 | 2.89 | 7 | $PO_4^{3-}$ |
| 307 | 9.5 | 0.24 | 0 | 0.0025 | 0.0004 | 1.3 | 0.06 | 22 | 9 | 2.44 | 6 | $PO_4^{3-}$ |
| 308 | 11.1 | 0.25 | 0 | 0.001 | 0.0014 | 4.7 | 0.08 | 26 | 9 | 2.89 | 7 | $PO_4^{3-}$ |
| 309 | 19 | 0.25 | 0 | 0 | 0.015 | 12 | 0.05 | 27 | 10 | 2.7 | 7 | $PO_4^{3-}$ |

TABLE 19

| No. | Strength (MPa) | Elongation (%) | r-value (—) | Flat Portion Area Ratio (%) | LDR | Adhesion Flaking Resistance | Powdering Resistance | Note |
|---|---|---|---|---|---|---|---|---|
| 301 | 295 | 51 | 1.98 | 34 | 2.42 | excellent | excellent | Example |
| 302 | 295 | 51 | 1.98 | 36 | 2.42 | excellent | excellent | Example |
| 303 | 295 | 51 | 1.98 | 38 | 2.42 | excellent | excellent | Example |
| 304 | 295 | 51 | 1.98 | 35 | 2.41 | excellent | excellent | Example |
| 305 | 295 | 51 | 1.98 | 37 | 2.4 | excellent | excellent | Example |
| 306 | 295 | 52 | 2.05 | 67 | 1.86 | good | excellent | Example |
| 307 | 295 | 51 | 1.98 | 35 | 2.42 | excellent | excellent | Example |
| 308 | 295 | 51 | 1.98 | 40 | 2.43 | excellent | excellent | Example |
| 309 | 295 | 51 | 1.98 | 39 | 2.4 | excellent | bad | Comparative Example |

Example 4

A slab having a composition of Symbol D of Table 1 was heated to 1150° C. and subjected to hot rolling at a finishing temperature of 910 to 930° C. to produce a hot-rolled steel strip of 4 mm, and the hot-rolled steel strip was wound up at 680 to 720° C. After performing acid washing, cold rolling was performed on the hot-rolled steel strip to produce a cold-rolled steel strip of 0.8 mm. Moreover, using continuous hot dip galvanizing equipment in an in-line annealing system, annealing, galvanizing, and alloying were performed on the cold-rolled steel strip, thereby producing a galvannealed steel sheet. In the galvannealing process, the annealing atmosphere was a mixed gas of 5 vol % of hydrogen and 95 vol % of nitrogen, the annealing temperature was 800 to 840° C., and the annealing time was 90 seconds. As the hot dip galvanizing bath, a hot dip galvanizing bath having an effective Al concentration of 0.105% was used, and the amount of zinc was controlled to 50 g/m$^2$ using a gas wiper. During heating in alloying, heating equipment in an induction heating system was used to perform the alloying at 420 to 600° C. In addition, as comparative examples, galvanized steel sheets were produced which were not subjected to alloying while being subjected to hot dip galvanization.

In skin pass rolling, a bright roll having a work roll diameter of 480 mm was used. Moreover, skin pass rolling was performed on each galvannealed steel sheet to achieve elongation ratios of 0.8 to 1.2%.

Furthermore, treatment liquids in which the concentration of potassium permanganate and the concentration of phosphoric acid were different were applied to the galvannealed steel sheets to allow the galvannealed layer on the galvannealed surface to react with the treatment liquids, thereby producing composite oxide layers of Mn, Zn, and P. The coated amount of the treatment liquid was controlled by changing the amount of the treatment liquid applied.

The Fe concentration Fe % and the Al concentration Al % in the galvannealed layer, the P content and the Mn content in the composite oxide layer of Mn, Zn, and P, and the thickness of the composite oxide layer of Mn, Zn, and P were measured using the same methods as in Example 1.

With regard to the kinds of the P compounds in the composite oxide layer of Mn, Zn, and P, existence of $PO_4^{3-}$ was confirmed using a phosphorus molybdenum blue method.

The X-ray diffraction intensity ratios ($I\eta/ISi$, $I\zeta/ISi$, and $I\Gamma/ISi$) of phases were measured by the same methods as in Example 1.

In addition, as indexes of formability, strength, elongation, and Lankford value r (as the r-value, the average of the r-value of 0°, the r-value of 45°, and the r-value of 90° was used) were measured using the same methods as in Example 1.

The area ratio of the flat portion on the galvannealed surface, the surface roughness Ra of the flat portion, and the surface roughness Ra of the rough portion were measured using the same methods as in Example 1. The evaluation method of the surface roughness was the same as in Example 1.

Here, with regard to the galvanized steel sheets which are comparative examples, since unevenness (rough surface) formed due to alloying did not occur (rough portions did not exist), surface roughnesses were not measured.

Deep drawability was evaluated by measuring the limiting drawing ratio (LDR) R using the same TZP test as in Example 1.

In addition, adhesion, flaking resistance, and powdering resistance were evaluated using the same methods as in Example 3.

The results are shown in Tables 20 and 21. In Comparative Example No. 405, the Fe concentration Fe % in the galvannealed layer was higher than 12% and $I\Gamma/ISi$ was higher than 0.004, so that adhesion of the galvannealed layer was bad. In addition, in the galvanized steel sheet of No. 406 (comparative example), a flat portion and a rough portion were not confirmed, and since Iη/ISi was higher than 0.0006, the adhesion of the galvannealed layer was bad.

In examples excluding the above-mentioned numbers (comparative examples), the galvannealed layer was suitably alloyed. Accordingly, the galvannealed steel sheets in these examples satisfied Formula (1) and thus exhibited excellent deep drawability and plating adhesion.

vannealed surface to react with the treatment liquids, thereby producing composite oxide layers of Mn, Zn, and P. The coated amount of the treatment liquid was controlled by changing the amount of the treatment liquid applied.

The Fe concentration Fe % and the Al concentration Al % in the galvannealed layer, the P content and the Mn content in the composite oxide layer of Mn, Zn, and P, and the thickness

TABLE 20

| No. | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|
| | | | Iη/ISi (—) | IÇ/ISi (—) | IΓ/ISi (—) | | | P Content (mg/m²) | Mn Content (mg/m²) | P/Mn (—) | Thickness (nm) | Kind of P Compound |
| 401 | 10.4 | 0.25 | 0 | 0.0015 | 0.0005 | G | G | 25 | 16 | 1.56 | 7 | PO₄³⁻ |
| 402 | 9.5 | 0.24 | 0 | 0.0025 | 0.0004 | G | G | 25 | 8 | 3.13 | 6 | PO₄³⁻ |
| 403 | 11.1 | 0.25 | 0 | 0.001 | 0.0014 | G | G | 27 | 9 | 3 | 7 | PO₄³⁻ |
| 404 | 12 | 0.25 | 0 | 0.001 | 0.004 | G | G | 28 | 11 | 2.55 | 9 | PO₄³⁻ |
| 405 | 15 | 0.25 | 0 | 0 | 0.005 | G | G | 27 | 8 | 3.38 | 7 | PO₄³⁻ |
| 406 | 0.5 | 0.24 | 0.025 | 0 | 0 | G | G | 24 | 8 | 3 | 6 | PO₄³⁻ |

TABLE 21

| No. | Strength (MPa) | Elongation (%) | r-value (—) | Flat Portion Area Ratio (%) | LDR | Adhesion Flaking Resistance | Adhesion Powdering Resistance | Note |
|---|---|---|---|---|---|---|---|---|
| 401 | 295 | 51 | 1.98 | 38 | 2.42 | excellent | excellent | Example |
| 402 | 295 | 51 | 1.98 | 35 | 2.42 | excellent | excellent | Example |
| 403 | 295 | 51 | 1.98 | 37 | 2.42 | excellent | excellent | Example |
| 404 | 295 | 51 | 1.98 | 36 | 2.42 | excellent | excellent | Example |
| 405 | 295 | 51 | 1.98 | 36 | 2.42 | excellent | bad | Comparative Example |
| 406 | 295 | 53 | 2.06 | — | 2.42 | bad | excellent | Comparative Example |

Example 5

A slab (high strength steel, low carbon steel) having a composition of Table 22 was heated to 1150° C. and subjected to hot rolling at a finishing temperature of 910 to 930° C. to produce a hot-rolled steel strip of 4 mm, and the hot-rolled steel strip was wound up at 500 to 600° C. After performing acid washing, cold rolling was performed on the hot-rolled steel strip to produce a cold-rolled steel strip of 0.8 mm. Moreover, using continuous hot dip galvanizing equipment in an in-line annealing system, annealing, galvanizing, and alloying were performed on the cold-rolled steel strip thereby producing a galvannealed steel sheet. In the galvaneling process, the annealing atmosphere was a mixed gas of 5 vol % of hydrogen and 95 vol % of nitrogen, the annealing temperature was 800 to 840° C., and the annealing time was 90 seconds. As the hot dip galvanizing bath, a hot dip galvanizing bath having an effective Al concentration of 0.102% was used, and the amount of zinc was controlled to 50 g/m² using a gas wiper. During heating in alloying, heating equipment in an induction heating system was used to perform the alloying at 440 to 550° C. In skin pass rolling, a bright roll having a work roll diameter of 480 mm was used. Moreover, skin pass rolling was performed on each galvannealed steel sheet to achieve elongation ratios shown in Tables 24 and 26.

Furthermore, treatment liquids in which the concentration of potassium permanganate and the concentration of phosphoric acid were different were applied to the galvannealed steel sheets to allow the galvannealed layer on the galof the composite oxide layer of Mn, Zn, and P were measured using the same methods as in Example 1.

With regard to the kinds of the P compounds in the composite oxide layer of Mn, Zn, and P, existence of PO₄³⁻ was confirmed using a phosphorus molybdenum blue method.

The X-ray diffraction intensity ratios (Iη/ISi, IÇ/ISi, and IΓ/ISi) of phases were measured by the same methods as in Example 1.

In addition, as indexes of formability, strength, elongation, and Lankford value r (as the r-value, the average of the r-value of 0°, the r-value of 45°, and the r-value of 90° was used) were measured using the same methods as in Example 1.

The area ratio of the flat portion on the galvannealed surface, the surface roughness Ra of the flat portion, and the surface roughness Ra of the rough portion were measured using the same methods as in Example 1. The evaluation method of the surface roughness was the same as in Example 1.

Deep drawability was evaluated by measuring the limiting drawing ratio (LDR) R using the same TZP test as in Example 1.

The results are shown in Tables 23 to 26. In Comparative Examples Nos. 501, 516, 519, 522, 525, and 528, galvannealed steel sheets in which the composite oxides of Mn, Zn, and P were not formed were used. Accordingly, in these comparative examples, Formula (1) was not satisfied. In Comparative Example No. 504, the P content in the composite oxide layer was smaller than 1 mg/m², so that Formula (1) was not satisfied. In Comparative Example No. 508, the Mn content in the composite oxide layer was smaller than 0.1 mg/m², so that Formula (1) was not satisfied. In Comparative Example No. 511, the area ratio of the flat portion was less than 10%, so that Formula (1) was not satisfied.

In examples excluding the above-mentioned numbers (comparative examples), galvannealed steel sheets having galvannealed layers which have sufficient area ratios of flat portions and composite oxide layers which have sufficient Mn contents and P contents were used. Accordingly, the galvannealed steel sheets according to these examples satisfied Formula (1) and were excellent in deep drawability. In these examples, as compared with comparative examples in which the composite oxides of Mn, Zn, and P were not applied to the galvannealed surface layers, the limiting drawing ratio R was increased by 0.06 to 0.3. In comparison of the results of Tables 23 to 26 with reference to FIG. 1, the increment in the limiting drawing ratio R corresponds to the fact that the increment (deep drawability enhancement effect) in the r-value was 0.2 to 1.0.

TABLE 22

| Symbol | Chemical Composition (mass %) | | | | | | Tensile Strength (MPa) | Elongation (%) |
|---|---|---|---|---|---|---|---|---|
| | C | Si | Mn | P | S | Al | N | | |
| J | 0.070 | .43 | 2.18 | 0.011 | 0.002 | 0.035 | 0.0028 | 597 | 33 |
| K | 0.070 | .71 | 2.08 | 0.004 | 0.002 | 0.031 | 0.0030 | 711 | 29 |
| L | 0.071 | .14 | 1.95 | 0.007 | 0.003 | 0.037 | 0.0027 | 610 | 34 |
| M | 0.081 | .65 | 1.80 | 0.008 | 0.003 | 0.027 | 0.0035 | 620 | 33 |
| N | 0.180 | .94 | 2.77 | 0.018 | 0.004 | 0.037 | 0.0039 | 1120 | 8 |
| O | 0.081 | .83 | 2.35 | 0.004 | 0.005 | 0.063 | 0.0030 | 875 | 26 |

TABLE 23

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | Kind of P Compound |
|---|---|---|---|---|---|---|---|---|---|---|---|---|---|
| | | | | $I_\eta/I_{Si}$ (—) | $I_\zeta/I_{Si}$ (—) | $I_\Gamma/I_{Si}$ (—) | | | P Content (mg/m²) | Mn Content (mg/m²) | P/Mn (—) | Thickness (nm) | |
| 501 | Steel Sheet J | 10.7 | 0.25 | 0 | 0.0015 | 0.0005 | G | G | — | — | — | — | — |
| 502 | Steel Sheet J | 10.7 | 0.25 | 0 | 0.0015 | 0.0005 | G | G | 13 | 11 | 1.18 | 4 | $PO_4^{3-}$ |
| 503 | Steel Sheet J | 10.7 | 0.25 | 0 | 0.0015 | 0.0005 | G | G | 24 | 16 | 1.50 | 7 | $PO_4^{3-}$ |
| 504 | Steel Sheet J | 10.7 | 0.25 | 0 | 0.0015 | 0.0005 | G | G | 0.5 | 1.1 | 0.45 | 0.3 | $PO_4^{3-}$ |
| 505 | Steel Sheet J | 10.7 | 0.25 | 0 | 0.0015 | 0.0005 | G | G | 1.2 | 1 | 1.20 | 0.3 | $PO_4^{3-}$ |
| 506 | Steel Sheet J | 10.7 | 0.25 | 0 | 0.0015 | 0.0005 | G | G | 5.3 | 3 | 1.77 | 1.5 | $PO_4^{3-}$ |
| 507 | Steel Sheet J | 10.7 | 0.25 | 0 | 0.0015 | 0.0005 | G | G | 88 | 50 | 1.76 | 26 | $PO_4^{3-}$ |
| 508 | Steel Sheet J | 10.7 | 0.25 | 0 | 0.0015 | 0.0005 | G | G | 1.2 | 0.05 | 24 | 0.2 | $PO_4^{3-}$ |
| 509 | Steel Sheet J | 10.7 | 0.25 | 0 | 0.0015 | 0.0005 | G | G | 2.1 | 0.1 | 21 | 0.4 | $PO_4^{3-}$ |
| 510 | Steel Sheet J | 10.7 | 0.25 | 0 | 0.0015 | 0.0005 | G | G | 5 | 1 | 5 | 1.5 | $PO_4^{3-}$ |
| 511 | Steel Sheet J | 10.7 | 0.25 | 0 | 0.0015 | 0.0005 | G | G | 33 | 22 | 1.50 | 9 | $PO_4^{3-}$ |
| 512 | Steel Sheet J | 10.7 | 0.25 | 0 | 0.0015 | 0.0005 | G | G | 16 | 14 | 1.14 | 6 | $PO_4^{3-}$ |
| 513 | Steel Sheet J | 10.7 | 0.25 | 0 | 0.0015 | 0.0005 | G | G | 10 | 9 | 1.11 | 3 | $PO_4^{3-}$ |
| 514 | Steel Sheet J | 10.7 | 0.25 | 0 | 0.0015 | 0.0005 | G | G | 27 | 6 | 4.5 | 8 | $PO_4^{3-}$ |
| 515 | Steel Sheet J | 10.7 | 0.25 | 0 | 0.0015 | 0.0005 | G | G | 17 | 10 | 1.7 | 5 | $PO_4^{3-}$ |

TABLE 24

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 501 | 597 | 33 | 0.96 | 1 | 36 | 1.94 | Comparative Example |
| 502 | 597 | 33 | 0.96 | 1 | 35 | 2.11 | Example |
| 503 | 597 | 33 | 0.96 | 1 | 36 | 2.09 | Example |
| 504 | 597 | 33 | 0.96 | 1 | 35 | 1.99 | Comparative Example |
| 505 | 597 | 33 | 0.96 | 1 | 36 | 2.03 | Example |
| 506 | 597 | 33 | 0.96 | 1 | 35 | 2.07 | Example |
| 507 | 597 | 33 | 0.96 | 1 | 36 | 2.13 | Example |
| 508 | 597 | 33 | 0.96 | 1 | 36 | 2 | Comparative Example |
| 509 | 597 | 33 | 0.96 | 1 | 37 | 2.04 | Example |
| 510 | 597 | 33 | 0.96 | 1 | 36 | 2.06 | Example |
| 511 | 597 | 33 | 0.96 | 0.2 | 8 | 1.98 | Comparative Example |
| 512 | 597 | 33 | 0.96 | 0.3 | 11 | 2.04 | Example |
| 513 | 597 | 33 | 0.96 | 0.6 | 20 | 2.07 | Example |
| 514 | 597 | 33 | 0.96 | 1.5 | 55 | 20.9 | Example |
| 515 | 597 | 33 | 0.96 | 2 | 70 | 2.1 | Example |

TABLE 25

| No. | Kind of Steel Sheet | Fe % in Galvannealed Layer (mass %) | Al % in Galvannealed Layer (mass %) | X-ray Diffraction Intensity in Galvannealed Layer | | | Surface Roughness of Rough Portion | Surface Roughness of Flat Portion | Composite Oxide of Mn, Zn, P | | | | |
|---|---|---|---|---|---|---|---|---|---|---|---|---|---|
| | | | | Iη/ISi (—) | IÇ/ISi (—) | IΓ/ISi (—) | | | P Content (mg/m²) | Mn Content (mg/m²) | P/Mn (—) | Thickness (nm) | Kind of P Compound |
| 516 | Steel Sheet K | 9.5 | 0.25 | 0 | 0.0038 | 0.0004 | G | G | — | — | — | — | — |
| 517 | Steel Sheet K | 9.5 | 0.25 | 0 | 0.0038 | 0.0004 | G | G | 13 | 11 | 1.18 | 4 | PO$_4^{3-}$ |
| 518 | Steel Sheet K | 9.5 | 0.25 | 0 | 0.0038 | 0.0004 | G | G | 25 | 16 | 1.56 | 7 | PO$_4^{3-}$ |
| 519 | Steel Sheet L | 11.6 | 0.24 | 0 | 0.0008 | 0.0016 | G | G | — | — | — | — | — |
| 520 | Steel Sheet L | 11.6 | 0.24 | 0 | 0.0008 | 0.0016 | G | G | 23 | 9 | 2.56 | 6 | PO$_4^{3-}$ |
| 521 | Steel Sheet L | 11.6 | 0.24 | 0 | 0.0008 | 0.0016 | G | G | 25 | 17 | 1.47 | 8 | PO$_4^{3-}$ |
| 522 | Steel Sheet M | 10.4 | 0.24 | 0 | 0.0019 | 0.0005 | G | G | — | — | — | — | — |
| 523 | Steel Sheet M | 10.4 | 0.24 | 0 | 0.0019 | 0.0005 | G | G | 23 | 11 | 2.09 | 7 | PO$_4^{3-}$ |
| 524 | Steel Sheet M | 10.4 | 0.24 | 0 | 0.0019 | 0.0005 | G | G | 26 | 16 | 1.63 | 8 | PO$_4^{3-}$ |
| 525 | Steel Sheet N | 11.1 | 0.24 | 0 | 0.0013 | 0.001 | G | G | — | — | — | — | — |
| 526 | Steel Sheet N | 11.1 | 0.24 | 0 | 0.0013 | 0.001 | G | G | 26 | 11 | 2.36 | 8 | PO$_4^{3-}$ |
| 527 | Steel Sheet N | 11.1 | 0.24 | 0 | 0.0013 | 0.001 | G | G | 26 | 15 | 1.73 | 7 | PO$_4^{3-}$ |
| 528 | Steel Sheet O | 9.9 | 0.24 | 0 | 0.0025 | 0.0004 | G | G | — | — | — | — | — |
| 529 | Steel Sheet O | 9.9 | 0.24 | 0 | 0.0025 | 0.0004 | G | G | 21 | 10 | 2.1 | 6 | PO$_4^{3-}$ |
| 530 | Steel Sheet O | 9.9 | 0.24 | 0 | 0.0025 | 0.0004 | G | G | 24 | 16 | 1.50 | 8 | PO$_4^{3-}$ |

TABLE 26

| No. | Strength (MPa) | Elongation (%) | r-value (—) | Skin Pass Rolling Elongation Ratio (%) | Flat Portion Area Ratio (%) | LDR | Note |
|---|---|---|---|---|---|---|---|
| 516 | 711 | 29 | 0.92 | 1 | 36 | 1.93 | Comparative Example |
| 517 | 711 | 29 | 0.92 | 1 | 37 | 2.08 | Example |
| 518 | 711 | 29 | 0.92 | 1 | 37 | 2.07 | Example |
| 519 | 610 | 34 | 0.94 | 1 | 37 | 1.94 | Comparative Example |
| 520 | 610 | 34 | 0.94 | 1 | 36 | 2.1 | Example |
| 521 | 610 | 34 | 0.94 | 1 | 36 | 2.08 | Example |
| 522 | 620 | 33 | 1.01 | 1 | 36 | 1.97 | Comparative Example |
| 523 | 620 | 33 | 1.01 | 1 | 35 | 2.12 | Example |
| 524 | 620 | 33 | 1.01 | 1 | 35 | 2.1 | Example |
| 525 | 1120 | 8 | 0.89 | 1 | 36 | 1.92 | Comparative Example |
| 526 | 1120 | 8 | 0.89 | 1 | 36 | 2.1 | Example |
| 527 | 1120 | 8 | 0.89 | 1 | 36 | 2.07 | Example |
| 528 | 875 | 26 | 0.95 | 1 | 35 | 1.95 | Comparative Example |
| 529 | 875 | 26 | 0.95 | 1 | 37 | 2.12 | Example |
| 530 | 875 | 26 | 0.95 | 1 | 36 | 2.09 | Example |

Example 6

A slab having a composition of Symbol F of Table 1 was heated to 1150° C. and subjected to hot rolling at a finishing temperature of 910 to 930° C. to produce a hot-rolled steel strip of 4 mm, and the hot-rolled steel strip was wound up at 680 to 720° C. After performing acid washing, cold rolling was performed on the hot-rolled steel strip to produce a cold-rolled steel strip of 0.8 mm. Moreover, using hot dip continuous galvanizing equipment in an in-line annealing system, annealing, galvanizing, and alloying were performed on the cold-rolled steel strip, thereby producing a galvannealed steel sheet. In the galvannealing process, the annealing atmosphere was a mixed gas of 5 vol % of hydrogen and 95 vol % of nitrogen, the annealing temperature was 800 to 840° C., and the annealing time was 90 seconds. As the hot dip galvanizing bath, a hot dip galvanizing bath having an effective Al concentration of 0.105% was used, and the amount of zinc was controlled to 50 g/m² using a gas wiper. During heating in alloying, heating equipment in an induction heating system was used to perform the alloying at 440 to 550° C. In skin pass rolling, a bright roll having a work roll diameter of 480 mm was used.

Furthermore, treatment liquids in which the concentration of potassium permanganate and the concentration of phosphoric acid were different were applied to the galvannealed steel sheets to allow the galvannealed layer on the galvannealed surface to react with the treatment liquids, thereby producing composite oxide layers of Mn, Zn, and P. The coated amount of the treatment liquid was controlled by changing the amount of the treatment liquid applied.

The Fe concentration Fe % and Al concentration Al % in the galvannealed layer, the P content and Mn content in the composite oxide layer of Mn, Zn, and P, and the thickness of the composite oxide layer of Mn, Zn, and P were measured using the same methods as in Example 1.

With regard to the kinds of the P compounds in the composite oxide layer of Mn, Zn, and P, existence of PO$_4^{3-}$ was confirmed using a phosphorus molybdenum blue method.

The X-ray diffraction intensity ratios (Iη/ISi, IÇ/ISi, and IΓ/ISi) of phases were measured by the same methods as in Example 1.

In addition, as indexes of formability, strength, elongation, and Lankford value r (as the r-value, the average of the r-value of 0°, the r-value of 45°, and the r-value of 90° was used) were measured using the same methods as in Example 1.

The area ratio of the flat portion on the galvannealed surface, the surface roughness Ra of the flat portion, and the surface roughness Ra of the rough portion were measured using the same methods as in Example 1. The evaluation method of the surface roughness was the same as in Example 1.

With regard to formability, a conical cup forming test was performed under the following conditions and the formation available BHF range was evaluated.

Blank diameter ($D_0$): φ215 mm
Tool size:
Punch diameter ($D_0$): φ78 mm, punch shoulder radius r: 8 mm
Die hole diameter: φ140 mm, die shoulder radius r: 10 mm
BHF (blank holding force): 10 to 200 kN
Forming height: 45 mm
Evaluation: formation available BHF range in which fractures and wrinkles do not occur.

Evaluation of wrinkles was performed using a three-dimensional shape measurement device. A vertical wall having a height of 15 mm from a flange surface was measured, and the case where the difference between the maximum and the minimum from an approximate arc was greater than 0.8 mm was evaluated as the generation of wrinkles.

The results are shown in Tables 27 and 28. In Comparative Example No. 601, galvannealed steel sheets in which composite oxides of Mn, Zn, and P were not formed were used.

In examples excluding No. 601 (comparative example), the composite oxide layers in which the Mn content and the P content were sufficient were produced, and thus lubricity was enhanced, so that an increase in the fracture limit load was observed. In addition, in Nos. 603 to 607 in which the composite oxide layers have thicknesses of 0.1 to 10 nm, the wrinkle limit load was hardly changed, and the fracture limit load was increased, so that the forming allowable range was widened.

TABLE 27

| No. | Fe % in Galvannealed Layer (mass %) | Al % in Galvannealed Layer (mass %) | X-ray Diffraction Intensity in Galvannealed Layer Iη/ISi (—) | IζISi (—) | IΓ/ISi (—) | Surface Roughness of Rough Portion | Surface Roughness of Flat Portion | Composite Oxide of Mn, Zn, P | | | | |
|---|---|---|---|---|---|---|---|---|---|---|---|---|
| | | | | | | | | P Content ($mg/m^2$) | Mn Content ($mg/m^2$) | P/Mn (—) | Thickness (nm) | Kind of P Compound |
| 601 | 10.3 | 0.24 | 0 | 0.0019 | 0.0005 | G | G | — | — | — | — | — |
| 602 | 10.3 | 0.24 | 0 | 0.0019 | 0.0005 | G | G | 40 | 35 | 1.14 | 12 | $PO_4^{3-}$ |
| 603 | 10.3 | 0.24 | 0 | 0.0019 | 0.0005 | G | G | 31 | 27 | 1.15 | 9 | $PO_4^{3-}$ |
| 604 | 10.3 | 0.24 | 0 | 0.0019 | 0.0005 | G | G | 25 | 16 | 1.56 | 7 | $PO_4^{3-}$ |
| 605 | 10.3 | 0.24 | 0 | 0.0019 | 0.0005 | G | G | 1 | 1 | 1.00 | 0.3 | $PO_4^{3-}$ |
| 606 | 10.3 | 0.24 | 0 | 0.0019 | 0.0005 | G | G | 5 | 1 | 5 | 1.5 | $PO_4^{3-}$ |
| 607 | 10.3 | 0.24 | 0 | 0.0019 | 0.0005 | G | G | 14 | 11 | 1.27 | 4 | $PO_4^{3-}$ |
| 608 | 10.3 | 0.24 | 0 | 0.0019 | 0.0005 | G | G | 90 | 50 | 1.80 | 26 | $PO_4^{3-}$ |

TABLE 28

| No. | Strength (MPa) | Elongation (%) | r-value (—) | Flat Portion Area Ratio (%) | Wrinkle Limit Load (kN) | Fracture Limit Load (kN) | Forming Allowable Range | Note |
|---|---|---|---|---|---|---|---|---|
| 601 | 315 | 48 | 1.61 | 36 | 40 | 100 | 70 | Comparative Example |
| 602 | 315 | 48 | 1.61 | 36 | 70 | 130 | 70 | Example |
| 603 | 315 | 48 | 1.61 | 36 | 50 | 130 | 90 | Example |
| 604 | 315 | 48 | 1.61 | 36 | 40 | 120 | 90 | Example |
| 605 | 315 | 48 | 1.61 | 36 | 40 | 110 | 80 | Example |
| 606 | 315 | 48 | 1.61 | 36 | 40 | 110 | 80 | Example |
| 607 | 315 | 48 | 1.61 | 36 | 40 | 120 | 90 | Example |
| 608 | 315 | 48 | 1.61 | 36 | 90 | 150 | 70 | Example |

Industrial Applicability

It is possible to provide a galvannealed steel sheet having excellent deep drawability and plating adhesion.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

REFERENCE SYMBOLS LIST

1 steel sheet
2 galvannealed layer
3 flat portion
4 rough portion (recessed portion)
5 composite oxide layer
10 galvannealed steel sheet
23 protruded portion
24 recessed portion

What is claimed is:
1. A galvannealed steel sheet comprising:
a steel sheet;
a galvannealed layer which is formed on at least one surface of the steel sheet and includes an amount equal to or more than 0.05 mass % and equal to or less than 0.5 mass

% of Al, an amount equal to or more than 6 mass % and equal to or less than 12 mass % of Fe, an amount equal to or less than 2 mass % of at least one of Pb, Sb, Si, Sn, Mg, Mn, Ni, Cr, Co, Ca, Cu, Li, Ti, Be, Bi, and rare earth elements as needed, and a balance composed of Zn and inevitable impurities; and a composite oxide layer of Mn, Zn, and P which is formed on a surface of the galvannealed layer, includes an amount equal to or more than 0.1 mg/m$^2$ and equal to or less than 100 mg/m$^2$ of Mn, an amount equal to or more than 1 mg/m$^2$ and equal to or less than 100 mg/m$^2$ of P, and Zn, has a P/Mn ratio of equal to or higher than 0.3 and equal to or lower than 50, wherein the galvannealed layer includes a flat portion having an area ratio of equal to or higher than 10% and equal to or lower than 70% and a rough portion which is at a position closer to the steel sheet than the flat portion at an interface of the galvannealed layer and the composite oxide layer, the composite oxide layer of Mn, Zn, and P contains an amorphous compound;

a surface roughness Ra of the rough portion is equal to or higher than 0.5 μm and equal to or lower than 10 μm, and a surface roughness Ra of the flat portion is equal to or higher than 0.01 μm and lower than 0.5 μm.

2. The galvannealed steel sheet according to claim 1, wherein a thickness of the composite oxide layer of Mn, Zn, and P is equal to or higher than 0.1 nm and lower than 100 nm.

3. The galvannealed steel sheet according to claim 1, wherein a thickness of the composite oxide layer of Mn, Zn, and P is equal to or higher than 0.1 nm and lower than 10 nm.

4. The galvannealed steel sheet according to claim 1 or 2, wherein the composite oxide layer of Mn, Zn, and P includes at least one of phosphoric acid group, phosphorous acid group, and hypophosphorous acid group.

5. The galvannealed steel sheet according to claim 1 or 2, wherein a ratio Iη/ISi of an X-ray diffraction intensity Iη of an interplanar spacing d of the galvannealed layer of 1.237 Å to an X-ray diffraction intensity ISi of an interplanar spacing d of an Si powder standard of 3.13 Å is equal to or lower than 0.0006, a ratio Iζ/ISi of an X-ray diffraction intensity Iζ of an interplanar spacing d of the galvannealed layer of 1.26 Å to the X-ray diffraction intensity ISi of the interplanar spacing d of the Si powder standard of 3.13 Å is equal to or higher than 0.0005, and a ratio IΓ/ISi of an X-ray diffraction intensity IΓ of an interplanar spacing d of the galvannealed layer of 1.222 Å to the X-ray diffraction intensity ISi of the interplanar spacing d of the Si powder standard of 3.13 Å is equal to or lower than 0.004.

6. The galvannealed steel sheet according to claim 1 or 2, wherein the steel sheet includes by mass an amount equal to or more than 0.0001% and equal to or less than 0.004% of C, an amount equal to or more than 0.001% and equal to or less than 0.15% of Si, an amount equal to or more than 0.01% and equal to or less than 1.0% of Mn, an amount equal to or more than 0.001% and equal to or less than 0.1% of P, an amount equal to or less than 0.015% of S, an amount equal to or more than 0.001% and equal to or less than 0.1% of Al, an amount equal to or more than 0.002% and equal to or less than 0.10% of Ti, an amount equal to or more than 0.0005% and equal to or less than 0.0045% of N, and a balance composed of Fe and inevitable impurities.

7. The galvannealed steel sheet according to claim 6, wherein the steel sheet further includes by mass an amount equal to or more than 0.002% and equal to or less than 0.10% of Nb.

8. The galvannealed steel sheet according to claim 6, wherein the steel sheet further includes an amount by mass equal to or more than 0.0001% and equal to or less than 0.003% of B.

9. The galvannealed steel sheet according to claim 6, wherein an r-value of the steel sheet is equal to or higher than 1.6 and equal to or lower than 2.2.

10. The galvannealed steel sheet according to claim 1 or 2, wherein the steel sheet includes by mass an amount more than 0.004% and equal to or less than 0.3% of C, an amount equal to or more than 0.001% and equal to or less than 2% of Si, an amount equal to or more than 0.01% and equal to or less than 4.0% of Mn, an amount equal to or more than 0.0001% and equal to or less than 0.15% of P, an amount equal to or less than 0.0015% of S, an amount equal to or less than 2% of Al, an amount equal to or more than 0.0005% and equal to or less than 0.004% of N, and a balance composed of Fe and inevitable impurities.

11. The galvannealed steel sheet according to claim 1 or 2, wherein the composite oxide layer of Mn, Zn, and P includes an aqueous P compound.

12. A producing method of the galvannealed steel sheet according to claim 1, the method comprising:

performing hot dip galvanization of the steel sheet;

forming a galvannealed layer including an amount equal to or more than 0.05% and equal to or less than 0.5% of Al and an amount equal to or more than 6% and equal to or less than 12% of Fe by alloying; and after performing skin pass rolling, forming a composite oxide layer of Mn, Zn, and P on a surface of the galvannealed layer by controlling a treatment liquid so that an amount equal to or more than 0.1 mg/m$^2$ and equal to or less than 100 mg/m$^2$ of Mn and an amount equal to or more than 1 mg/m$^2$ and equal to or less than 100 mg/m$^2$ of P are included and a P/Mn ratio is 0.3 to 50.

13. The producing method of the galvannealed steel sheet according to claim 12, wherein the skin pass rolling is performed to achieve an elongation ratio of equal to or higher than 0.3% and equal to or lower than 2.0%.

14. The producing method of the galvannealed steel sheet according to claim 12 or 13, wherein the treatment liquid is applied to the surface of the galvannealed layer using a coating coater.

* * * * *